United States Patent
Saito

(10) Patent No.: US 8,506,069 B2
(45) Date of Patent: Aug. 13, 2013

(54) INKJET INK SET, AND IMAGE FORMING METHOD

(75) Inventor: Ryo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 195 days.

(21) Appl. No.: 13/044,594

(22) Filed: Mar. 10, 2011

(65) Prior Publication Data

US 2011/0234689 A1 Sep. 29, 2011

(30) Foreign Application Priority Data

Mar. 26, 2010 (JP) ................................. 2010-073008

(51) Int. Cl.
*G01D 11/00* (2006.01)
*C09D 11/02* (2006.01)

(52) U.S. Cl.
USPC ........................................ 347/100; 106/31.48

(58) Field of Classification Search
USPC .................. 347/100; 106/31.48, 31.5, 31.52, 106/31.47
See application file for complete search history.

(56) References Cited

U.S. PATENT DOCUMENTS

| 7,736,427 | B2 * | 6/2010 | Kitamura et al. | 106/31.47 |
| 7,740,695 | B2 * | 6/2010 | Kitamura et al. | 106/31.47 |
| 8,070,869 | B2 * | 12/2011 | Wachi et al. | 106/31.5 |

FOREIGN PATENT DOCUMENTS

| JP | 2006-159907 A | 6/2006 |
| JP | 2008-105422 A | 5/2008 |
| JP | 4224491 B | 2/2009 |

* cited by examiner

*Primary Examiner* — Lamson Nguyen

(74) *Attorney, Agent, or Firm* — SOLARIS Intellectual Property Group, PLLC

(57) ABSTRACT

The present invention provides a an inkjet ink set including a fixing agent liquid which includes a cationic polymer and an acidic precipitant; and an ink which includes a water-based medium, a pigment having a first anionic polymer covalently bonded thereto, and a second anionic polymer, wherein the second anionic polymer is insoluble in the water-based medium.

11 Claims, No Drawings

INKJET INK SET, AND IMAGE FORMING METHOD

CROSS-REFERENCE TO RELATED APPLICATION

This application claims priority under 35 USC 119 from Japanese Patent Application No. 2010-073008, filed on Mar. 26, 2010, the disclosure of which is incorporated by reference herein.

BACKGROUND

1. Field of the Invention

The present invention relates to an ink set for inkjet printing, and an image forming method.

2. Related Art

An inkjet recording method is a method of performing recording by ejecting an ink in the form of liquid droplets from a number of nozzles provided in an inkjet head, and fixing the ink to the recording medium. In order to obtain high definition images with high resolution, investigations have been made on a fixing agent liquid (also referred to as fixing liquid, treatment liquid, or reaction liquid) containing a compound which accelerates the aggregation of ink, as a technology of rapidly fixing ink to a recording medium.

In this regard, there has been disclosed an image forming system which uses an inkjet ink including a first liquid vehicle, a pigment colorant, and an anionic or neutral latex-containing colloidal suspension, and a fixing agent composition including a second liquid vehicle and a cationic polymer, and this image forming system is considered to be able to form images having durability and smudge resistance (see, for example, Japanese Patent Application Laid-Open (JP-A) No. 2008-105422).

Furthermore, there has been disclosed an inkjet printing system using a fixing agent liquid containing a cationic polymer and an acidic precipitant, and an inkjet ink which includes a pigment having an anionic polymer covalently bonded thereto, and a nonionic surfactant or an anionic binder. This inkjet printing system is considered to be capable of improving (reducing) mottling during printing (see, for example, Japanese Patent No. 4224491 and JP-A No. 2006-159907).

SUMMARY

The present invention has been made in view of the above circumstances and provides a an inkjet ink set, including a fixing agent liquid which includes a cationic polymer and an acidic precipitant; and an ink which includes a water-based medium, a pigment having a first anionic polymer covalently bonded thereto, and a second anionic polymer, wherein the second anionic polymer is insoluble in the water-based medium.

DETAILED DESCRIPTION OF THE INVENTION

<<Inkjet Ink Set>>

The inkjet ink set of the invention includes a fixing agent liquid which comprises a cationic polymer and an acidic precipitant; and an ink which comprises a water-based medium, a pigment having a first anionic polymer covalently bonded thereto, and a second anionic polymer, wherein the second anionic polymer is insoluble in the water-based medium.

The inkjet ink set of the invention, which has such a constitution, is excellent in continuous ejectability. Furthermore, the inkjet ink set has excellent ejection stability and results in satisfactory restorability of nozzle after standstill.

Images formed by using the inkjet ink set of the invention have improved scratch resistance and are of high quality.

The inkjet ink set of the invention is suitable to be used in image formation according to an inkjet method, and is particularly preferable as an ink set to be used for the image forming method of the invention.

The inkjet ink set of the invention may be used in the form of an ink cartridge holding the ink and the fixing agent liquid integrally or independently, and from the viewpoint of convenient handleability or the like, it is preferable to use the inkjet ink set in the form of an ink cartridge. Ink cartridges constituted to include an ink set are known in the art, and the ink cartridges may be constructed by using appropriate known methods.

<Fixing Agent Liquid>

The fixing agent liquid according to the invention contains at least one cationic polymer and at least one acidic precipitant, and may be constituted to include other components as necessary. The fixing agent liquid is capable of accelerating aggregation of the components contained in the ink according to the invention (also referred to as "ink composition") when brought into contact with the ink.

[Cationic Polymer]

The cationic polymer in the fixing agent liquid reacts with any anionic component that is stably dispersed or dissolved in the ink, and accelerates aggregation of the anionic component, thereby allowing fixing of the ink to the recording medium.

Examples of the cationic polymer include a poly(vinylpyridine) salt, polyalkylaminoethyl acrylate, polyalkylaminoethyl methacrylate, poly(vinylimidazole), polyethyleneimine, polybiguanide, polyguanide, a polyamine and derivatives thereof, and polyallylamine and derivatives thereof.

Examples of commercially available cationic polymers include allylamine hydrochloride polymers such as PAA-HCL-01, PAA-HCL-03, PAA-HCL-05, PAA-HCL-3L, PAA-H-HCL, PAA-HCL-10L, PAA-05 and PAA-D11-HCL; and diallyl-based amine polymers such as PAS-H-1L, PAS-M-1L, PAS-A-1, PAS-J-81L, PAS-880 and PAS-92, all manufactured by Nitto Boseki Co., Ltd.

These compounds may be used singly, or two or more kinds may be used in combination.

The cationic polymer is particularly preferably a polyguanidine cationic polymer. There are no limitations on the polyguanidine cationic polymer, but from the viewpoint of enhancing the aggregatability of ink and the scratch resistance of images, at least one selected from a polymer of hexamethylene guanide (HMG) (PHMG), a polymer of hexamethylene biguanide (HMB) (PHMB), and a copolymer of HMB and HMG, is preferred.

The weight average molecular weight of the cationic polymer is such that a smaller molecular weight is preferred in view of the viscosity of the fixing agent liquid. When the fixing agent liquid is applied on a recording medium by an inkjet system, the weight average molecular weight is preferably in the range of 1,000 to 500,000, more preferably in the range of 1,500 to 200,000, and even more preferably in the range of 2,000 to 100,000. When the weight average molecular weight is 1000 or greater, it is advantageous from the viewpoint of the aggregation speed of the ink composition, and when the weight average molecular weight is 500,000 or less, it is advantageous in view of ejection reliability. However, an exception is made in the case where the fixing agent liquid is applied on a recording medium by a method other than an inkjet method.

The content of the cationic polymer in the fixing agent liquid is preferably 0.2% to 30% by mass, more preferably 0.5% to 25% by mass, even more preferably 1% to 20% by mass, and particularly preferably 4% to 10% by mass, relative to the total mass of the fixing agent liquid, from the viewpoint of the aggregation effect.

[Acidic Precipitant]

As the acidic precipitant, at least one selected from an organic acid, an inorganic acid, derivatives thereof (including optical isomers) and salts thereof (for example, polyvalent metal salt) may be used. These compounds may be used singly, or two or more kinds may be used in combination. The acidic precipitant is capable of producing an aggregate when brought into contact with the ink composition.

There are no particular limitations on the organic acid and inorganic acid that may be used as the acidic precipitant, but a compound having a phosphoric acid group, a phosphonic acid group, a phosphinic acid group, a sulfuric acid group, a sulfonic acid group, a sulfinic acid group, a thiocyanic acid group or a carboxyl group, or a salt thereof (for example, a polyvalent metal salt) may be used. Among them, a compound having a phosphoric acid group or a carboxyl group is more preferred, and a compound having a carboxyl group is even more preferred, from the viewpoint of the aggregation speed of the ink composition.

Specific examples of the compound that may be used as the acidic precipitant include polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, methanesulfonic acid, phosphoric acid, metaphosphoric acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, nitric acid, thiocyanic acid, derivatives (including optical isomers) of these compounds, and salts (for example, polyvalent metal salt) of these compounds, and the acidic precipitant is preferably selected from these. These compounds may be used singly, or two or more kinds may be used in combination.

Examples of the polyvalent metal salt include, from the viewpoint of high speed aggregatability, the salts of the alkaline earth metals of Group 2 of the Periodic Table (for example, magnesium and calcium), the transition metals of Group 3 of the Periodic Table (for example, lanthanum), cations from Group 13 of the Periodic Table (for example, aluminum), and lanthanides (for example, neodymium). Suitable examples of the metal salts include carboxylates (formate, benzoate, and the like), nitrate, chloride and thiocyanate. Among them, preferred examples include calcium salt or magnesium salt of a carboxylic acid (formic acid, benzoic acid or the like), calcium salt or magnesium salt of nitric acid, calcium chloride, magnesium chloride, and calcium salt or magnesium salt of thiocyanic acid.

The acidic precipitant according to the invention is preferably at least one selected from methanesulfonic acid, citric acid, succinic acid, phosphoric acid, glycolic acid, acetic acid, tartaric acid, oxalic acid and derivatives or salts of these acids, from the viewpoint of enhancing the aggregation speed of the ink composition.

The content of the acidic precipitant in the fixing agent liquid preferably includes an amount capable of quaternizing the cationic polymer. Furthermore, from the viewpoint of further increasing the aggregation effect, the content of the acidic precipitant is preferably 5% to 30% by mass, more preferably 10% to 30% by mass, and particularly preferably 10% to 27% by mass, relative to the total mass of the fixing agent liquid.

When the content of the acidic precipitant in the fixing agent liquid is adjusted to the range described above, an excellent aggregation effect is obtained, bleeding does not occur, and images of high precision drawing with controlled dot diameters are obtained.

[Organic Solvent]

The fixing agent liquid according to the invention preferably contains at least one organic solvent, and the organic solvent is more preferably a hydrophilic organic solvent. When the fixing agent liquid contains an organic solvent (particularly, a hydrophilic organic solvent), the surface tension may be adjusted, or prevention of drying and acceleration of penetration may be promoted.

Specific examples of the hydrophilic organic solvent include the hydrophilic organic solvents for the ink that will be described below. The organic solvents may be used singly, or two or more kinds may be used in mixture.

There are no particular limitations on the content of the organic solvent in the fixing agent liquid, but the content is preferably 1% to 30% by mass, and more preferably 5% to 15% by mass, from the viewpoint of adjustment of the surface tension, prevention of drying, acceleration of penetration, suppression of the reaction between the acidic precipitant and the composition in the recording medium, and the like.

[Surfactant]

The fixing agent liquid according to the invention may contain at least one surfactant. The surfactant is used as a surface tension adjusting agent. Examples of the surface tension adjusting agent include nonionic surfactants, cationic surfactant, anionic surfactants, and betaine surfactants.

Specific examples of the surfactant include the surfactants for the ink that will be described below. The surfactant may be used singly, or two or more kinds may be used in mixture.

[Water]

It is preferable that the fixing agent liquid according to the invention contain water. There are no particular limitations on the amount of water that is contained in the fixing agent liquid, but the content is preferably 10% to 99% by mass, more preferably 30% to 80% by mass, and even more preferably 50% to 70% by mass.

[Other Additives]

The fixing agent liquid according to the invention may further contain other additives in addition to the components described above. Examples of the other additives include known additives such as a discoloration preventing agent, an emulsion stabilizer, a penetration accelerating agent, an ultraviolet absorber, a preservative, an antifungal agent, a pH adjusting agent, a defoamant, a viscosity adjusting agent, a corrosion inhibitor, and a chelating agent. These various additives may be added directly after the preparation, or may be added during the preparation.

—Properties of Fixing Agent Liquid—

The pH (25° C.) of the fixing agent liquid is preferably 3.5 or lower, more preferably 0.5 to 2.5, even more preferably 0.7 to 2.3, and particularly preferably 0.8 to 2.0, from the viewpoint of the aggregation speed of the ink. In this case, the pH (25° C.) of the ink is preferably 7.0 or higher, and more preferably 7 to 10.

Inter alia, according to the invention, it is preferable that the pH (25° C.) of the ink be 7.0 or higher, and the pH (25° C.) of the fixing agent liquid be 3.5 or lower, from the viewpoint of the image density, resolution and increase in the speed of inkjet recording.

The viscosity of the fixing agent liquid is preferably in the range of 1 to 30 mPa·s, more preferably in the range of 1 to 20 mPa·s, even more preferably in the range of 2 to 15 mPa·s, and particularly preferably in the range of 2 to 10 mPa·s, from the viewpoint of the aggregation speed of the ink. Here, the viscosity is measured using a viscometer (trade name: TV-22, manufactured by Toki Sangyo Co., Ltd.) under the conditions of 20° C.

The surface tension of the fixing agent liquid is preferably 20 to 60 mN/m, more preferably 20 to 45 mN/m, and even more preferably 25 to 40 mN/m, from the viewpoint of the aggregation speed of the ink composition. The surface tension is measured using an automatic surface tensiometer (trade name: CBVP-Z, manufactured by Kyowa Interface Science Co., Ltd.) under the conditions of 25° C.

<Ink>

The ink (also referred to as "ink composition") according to the invention contains, in a water-based medium, at least one pigment having a first anionic polymer covalently bonded thereto, and at least one second anionic polymer, and may be constituted to include other components as necessary. The second anionic polymer that is contained in the ink according to the invention is insoluble in the water-based medium that constitutes the ink.

The ink according to the invention has reduced occurrence of foaming and has satisfactory defoamability.

[Water-Based Medium]

The "water-based medium" according to the invention refers to the liquid in which the pigment having a first anionic polymer covalently bonded thereto and the second anionic polymer are incorporated to form an ink.

The water-based medium according to the invention contains water as a solvent. The content of water is preferably 10% to 99% by mass, more preferably 30% to 80% by mass, and even more preferably 50% to 70% by mass, relative to the total amount of the ink.

It is preferable that the water-based medium according to the invention further contain at least one hydrophilic organic solvent. When the water-based medium contains a hydrophilic organic solvent, prevention of drying and acceleration of penetration of the ink may be promoted. In the case of using a hydrophilic organic solvent as a drying preventing agent, when an image is recorded by ejecting the ink by an inkjet method, clogging of nozzles that may occur as a result of drying of the ink at an ink ejection port may be effectively prevented.

The hydrophilic organic solvent may be used singly, or two or more kinds may be used in mixture.

In order to prevent drying, a hydrophilic organic solvent having a lower vapor pressure than water is preferred. Specific examples of the hydrophilic organic solvent that is suitable for the prevention of drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohols, such as ethylene glycol monomethyl (or ethyl)ether, diethylene glycol monomethyl (or ethyl)ether, and triethylene glycol monoethyl (or butyl)ether; heterocyclic rings such as 2-pyrrolidone, N-methyl-2-pyrrolidone, 1,3-dimethyl-2-imidazolidinone, and N-ethylmorpholine; sulfur-containing compounds such as sulfolane, dimethyl sulfoxide, and 3-sulfolene; polyfunctional compounds such as diacetone alcohol, and diethanolamine; and urea derivatives.

Among them, polyhydric alcohols such as glycerin and diethylene glycol are preferred. Furthermore, these may be used singly, or two or more kinds may be used in combination. These hydrophilic organic solvents are preferably contained in the ink composition at a proportion of 10% to 50% by mass.

Furthermore, in order to accelerate penetration, a hydrophilic organic solvent is suitably used from the viewpoint of allowing the ink composition to effectively penetrate into a recording medium. Specific examples of the hydrophilic organic solvent that is suitable for the acceleration of penetration include alcohols such as ethanol, isopropanol, butanol, di(or tri)ethylene glycol monobutyl ether, and 1,2-hexanediol. When these solvents are contained in the ink composition at a proportion of 5% to 30% by mass, satisfactory effects may be obtained. Furthermore, it is preferable that these hydrophilic organic solvents be used in an amount of addition to the extent that does not cause bleeding of prints and images, or print-through.

Furthermore, the hydrophilic organic solvent may also be used for adjusting the viscosity, in addition to the factors described above. Specific examples of the hydrophilic organic solvent that may be used for the adjustment of viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, tetraethylene glycol, polyethylene glycol, propylene glycol, dipropylene glycol, tripropylene glycol, polypropylene glycol, butylene glycol, trimethylolpropane, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

The content of the hydrophilic organic solvent in the water-based medium according to the invention is preferably 50% by mass or less, more preferably 5% by mass to 30% by mass, and even more preferably 10% by mass to 25% by mass, based on water.

[Pigment Having First Anionic Polymer Covalently Bonded Thereto]

The pigment having a first anionic polymer covalently bonded thereto has at least one first anionic polymer and a pigment, and the first anionic polymer is covalently bonded to the pigment. The pigment having the first anionic polymer covalently bonded (hereinafter, also referred to as "anionic polymer-bonded type pigment" or "polymer-modified pigment") is a pigment that may be dispersed in the water-based medium that constitutes the ink without using an additional dispersant.

The anionic polymer-bonded type pigment includes known pigments as the color material without particular limitations. The ink according to the invention may be prepared into an ink of yellow color, an ink of magenta color, an ink of cyan color, an ink of black color, an ink of red color, an ink of green color, and an ink of blue color, by modifying the hue of the color material.

The pigment may be any pigment that is conventionally used by those having ordinary skill in the art, such as a carbon product, or an organic coloring pigment including a blue, black, brown, cyan, green, white, violet, magenta, red, orange or yellow organic pigment. A mixture of different pigments may also be used. Examples of the carbon product include graphite, carbon black, glassy carbon, activated carbon, carbon fiber, and activated carbon black. Representative specific examples of carbon black are described in paragraph [0012] of Japanese Patent Application National Publication (Laid-Open) No. 2008-531762, but the examples are not limited to these.

Suitable examples of the classes of the organic coloring pigment include anthraquinone, phthalocyanine blue, phthalocyanine green, diazo, monoazo, pyranthrone, perylene, heterocyclic yellow, quinacridone, quinolonoquinolone, and (thio)indigoid. Other suitable examples of the organic coloring pigment are described in Colour Index, 3rd edition (the Society of Dyers and Colourists, 1982).

Furthermore, the pigment may be a pigment such as a carbon product which is oxidized by using an oxidizing agent for introducing an ionic and/or ionizable group onto the surface. The oxidized pigment thus prepared has, on the surface, a group containing a higher degree of oxygen. Examples of the oxidizing agent include, but not limited to, oxygen gas; ozone; peroxides such as hydrogen peroxide; persulfates such as sodium and potassium persulfates; hypohalogenites such as sodium hypochlorite; oxidizing acids such as nitric acid; sodium perchlorate; nitrogen oxides including $NO_2$; oxidizing agents containing transition metals, such as permanganates, osmium tetroxide and chromium oxide; and eerie ammonium nitrate. A mixture of oxidizing agents, and particularly a mixture of gaseous oxidizing agents such as oxygen and ozone, may also be used. In order to introduce an ionic or ionizable group, a modified pigment obtained by using a surface modification method such as sulfonylation may also be used.

The pigment may be a multiphase aggregate which includes a carbonaceous phase and a seed phase containing silicon, or a multiphase aggregate which includes a carbonaceous phase and a seed phase containing a metal. The multiphase aggregate which includes a carbonaceous phase and a seed phase containing silicon may be considered as a silicon-treated carbon black aggregate, and as long as it is understood that the seed containing silicon and/or the seed containing a metal is just a phase of aggregate such as the carbonaceous phase, the multiphase aggregate which includes the carbonaceous phase and the seed phase containing a metal may be considered as a metal-treated carbon black aggregate. The multiphase aggregate does not represent a mixture of a scattered carbon black aggregate and a scattered silica or metal aggregate. Rather, the multiphase aggregate that may be used as the pigment in the invention includes at least one region containing silicon or a metal that is on the surface or (although placed on the aggregate) in the vicinity of the aggregate, and/or is concentrated within the aggregate. Therefore, the aggregate includes at least two phases, in which one of the phases is carbon, and the other phase is a seed containing silicon, a seed containing a metal, or both. The seed containing silicon, which may constitute a portion of the aggregate, is not bound to the carbon black aggregate in the manner a silane coupling agent is bound, and the seed containing silicon actually constitutes a portion of the same aggregate, as the carbonaceous phase.

The metal-treated carbon black is an aggregate which includes at least a carbonaceous phase and a seed phase containing a metal. The seed containing a metal contains compounds which contain at least one selected from aluminum, zinc, magnesium, calcium, titanium, vanadium, cobalt, nickel, zirconium, tin, antimony, chromium, neodymium, lead, tellurium, barium, cesium, iron and molybdenum. The seed phase containing a metal may be dispersed in at least a portion of the aggregate, and constitutes a portion that is essentially included in the aggregate. The metal-treated carbon black may include a seed phase containing more than one type of metals, or the metal-treated carbon black may include a seed phase containing silicon and/or a seed phase containing boron.

The details of the production of these multiphase aggregates are explained in U.S. patent application publication Ser. Nos. 08/446,141, 08/446,142, 08/528,895, and 08/750,017, International Publication Nos. WO 96/37547, WO 08/828, 785, WO 08/837,493, and WO 09/061,871.

A carbon product coated with silica may also be used as a pigment, and is described in International Publication No. WO 96/37547. Furthermore, any pigment coated with silica may also be used. In the thus-coated pigments, in the same manner as in the case of the metal-treated carbon black and the multiphase aggregate, a coupling agent having a functionality capable of reacting with a film, silica or a metal phase, may be used so as to impart a necessary or desirable functionality to the pigment.

The pigment may have a wide range of BET surface areas, which is measured by nitrogen adsorption, due to the desired characteristics of the pigment. For example, the pigment surface may be about 10 $m^2/g$ to about 2000 $m^2/g$, which encompasses about 10 $m^2/g$ to about 1000 $m^2/g$, and about 50 $m^2/g$ to about 500 $m^2/g$. As it is known to those having ordinary skill in the art, a larger surface area corresponds to a smaller particle size in an identical particulate structure. A larger surface area is preferred, and in the case where the particles cannot be immediately used for the desired purpose, the pigment may be subjected, according to necessity, to a conventional size reduction or pulverization technology such as a milling medium, jet milling, microfluidization or ultrasonication treatment, in order to reduce the pigment to a smaller particle size. Furthermore, if the pigment is a fine particulate material including an aggregate of the first particles such as carbon black, the pigment may have a structure of about 10 ml/100 g to about 1000 ml/100 g, which encompasses about 40 ml/100 g to about 200 ml/100 g.

The anionic polymer-bonded type pigment has at least one anionic group or anionizable group bonded to the at least one polymer which is bonded to the pigment. Here, the "anionizable group" means a group capable of being ionized to exhibit anionic property. For example, the anionic group or anionizable group may be converted to an acidic group or a salt of an acidic group.

The acidic group may be converted to a derivative of an organic acid, such as a carboxylic acid group, a hydroxyl group, a sulfonic acid group, a sulfuric acid group or a phosphonic acid group. The anionic group or anionizable group may result in a functional group related to an aggregation reaction between the fixing agent liquid and the anionic polymer-bonded type pigment, on the surface of a recording medium.

There are no particular limitations on the polymer contained in the anionic polymer-bonded type pigment, and examples thereof include a polystyrene, a styrene-acrylic copolymer, a styrene-acrylic ester copolymer, a polyacrylic ester, a polymethacrylic ester, polyethyl acrylate, a styrene-butadiene copolymer, a butadiene copolymer, a polyurethane, an acrylonitrile-butadiene copolymer, a chloroprene copolymer, a crosslinked acrylic resin, a crosslinked styrene resin, vinylidene fluoride, a benzoguanamine resin, a polyethylene resin, a polypropylene resin, a styrene-methacrylic ester copolymer, a styrene-acrylic amide copolymer, n-isobutyl acrylate, vinyl acetate, acrylamide, polyvinyl acetal, a rosin resin, a vinylidene chloride resin, an ethylene-vinyl acetate copolymer, a vinyl acetate-acrylic copolymer, and a vinyl chloride resin. This polymer may be supported onto the pigment in an amount of about 20% to about 30% by mass of the anionic polymer-bonded type pigment.

The polymer-modified pigment is prepared by a process including polymerization of at least one polymerizable monomer from a modified pigment that will be described below. The polymeric group may be, for example, various different types of polymeric groups, including a homopolymer, a random copolymer a block copolymer, a graft copolymer, a branched copolymer or an alternating copolymer.

In general, there are three types of methods that may be used to prepare a pigment having at least one bonded polymeric group. These methods are referred to as "grafting-onto", "grafting-through", and "grafting-from" processes. The "grafting-from" process generally includes the polymerization of a monomer in the presence of a modified pigment having at least one bonded polymerizable group. Since the bonded polymer may sterically hinder a growing polymer chain from reaching the polymerizable group on the pigment surface, the presence of a bonded polymer may restrict new bonding. In addition, the "grafting-from" process typically includes producing a point of initiation on the pigment surface, and polymerization of the monomer directly from the point of initiation.

The polymer-modified pigment used in the invention is preferably prepared by the "grafting-from" process. An entire "grafting-from" process which is known in the art may also be used. For example, the polymer-modified pigment may be prepared by a process in which at least one polymerizable monomer is polymerized "from" a pigment having at least one transferable atom or group bonded thereto. Alternately, conventional radical polymerization in which at least one polymerizable monomer is polymerized "from" a pigment having a bonded initiating group, may also be used. Preferably, the polymer-modified pigment is prepared by using a polymerization process which includes a step of polymerizing at least one polymerizable monomer from a pigment having at least one transferable atom or group bonded thereto. Examples of such a polymerization process include atom transfer radical polymerization (ATRP), stable free radical (SFR) polymerization, and reversible addition-fragmentation chain transfer (RAFT) polymerization, similarly to ionic polymerization such as group transfer polymerization (GTP). These polymerization processes typically, but not necessarily, involve propagating chain terminals at a relatively low fixed concentration, in connection with chain terminals at a resting state. When the chain is at a resting state, the chain terminal contains a transferable atom or group. The chain terminal at a resting state may be converted to an ornamental chain terminal by losing the transferable atom or group.

The ATRP, SFR and RAFT are living radical polymerization methods used to prepare a polymer material from a radical polymerizable monomer using an initiator containing a radically transferable atom or group. These methods respectively have different types of transferable group. For example, the ATRP process typically involves transfer of a halogen group. The details of the ATRP process are described in, for example, Journal of the American Chemical Society 1995, 117, 5614 by Matyjaszewski, as well as ACS Symposium Series 768; and in Handbook of Radical Polymerization (K. Matyjaszewski and T. P. Davis (Editors): Wiley-Interscience, Hoboken 2002). The SFR polymerization generally involves transfer of a stable free radical group such as a nitroxyl group. The details of the nitroxide-mediated polymerization are described in, for example, Chapter 10 of Handbook of Radical Polymerization (K. Matyjaszewski and T. P. Davis (Editors): Wiley-Interscience, Hoboken 2002). For example, many other groups are shown in C. L. McCormick and A. B. Lowe, Accounts of Chemical Research 2004, 37(5), 312-325; however, the RAFT process described in Chiefari, et al., Macromolecules 1998, 31(16), 5559, is different from the nitroxide-mediated polymerization in that the group to be transferred is, for example, a thiocarbonylthio group. By comparison, the GTP process is a polymerization technology of polymerizing an anionic or cationic polymerizable monomer from an initiator containing an ionically transferable atom or group such as a silyl group (for example, a trimethylsilyl group). The details of the GTP process are described in, for example, Webster, et al., Journal of the American Chemical Society, 1983, 105(17), 5706-5708, and in Webster, Encyclopedia of Polymer Science and Engineering, 1987, 7, 580-588.

In a first embodiment, the polymer-modified pigment is preferably prepared by a process including a step of polymerizing at least one radical polymerizable monomer from a modified pigment having at least one radically transferable atom or group bonded thereto. Since the radical polymerized monomer is polymerized "from" a modified pigment, this is a "grafting-from" process. Therefore, the modified pigment provides a point of initiation for polymerization.

The type of the radically transferable atom or group carried by the modified pigment will be depending on which of the radical polymerization processes described above is employed. In the ATRP process, the radically transferable atom or group may be a group containing a halogen, such as a haloalkyl ester group, a haloalkyl ketone group or a haloalkyl amide group. Preferably, the halogen is chlorine or bromine. In the RAFT process, the radically transferable atom or group may include a thiocarbonylthio group, while in the SFR process, the radically transferable atom or group may include a nitroxide group.

The radically transferable atom or group may be directly bonded to the pigment, or may be linked to the pigment via one or two or more linking groups.

Examples of the radically transferable atom or group include groups represented by the following formula.

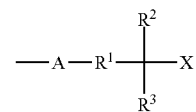

A represents a group that is bonded to the pigment. A and $R^1$, which may be identical or different, each independently represent a bond, a substituted or unsubstituted arylene, alkylene, aralkylene or alkylarylene group, —O—, —S—, —$OR^4$—, —$NR^4$—, —S(=O)—, —C(=O)—, —COO—, —OC(=O)—, —COO-ALK-OOC— (wherein ALK represents a branched or non-branched $C_2$-$C_8$ alkylene group (such as an ethylene group, a propylene group, a butylene group, an isobutylene group, a pentylene group, an hexylene group or a neopentylene group), —CONR$^4$—, —NR$^4$C(=O)—, —SO$_2$—, —P(=O)$_2$O—, or —P(=OXOR$^4$)— (wherein R$^4$ represents a hydrogen atom, an alkyl group or an aryl group)). R$^2$ and R$^3$, which may be identical or different, each independently represent H, an alkyl group, an aryl group, —OR$^5$, —NHR$^5$, —N(R$^5$)$_2$, or —SR$^5$ (wherein R$^5$ independently represents an alkyl group or an aryl group). X represents a radically transferable atom or group such as a halogen atom.

The modified pigment having a group represented by the above formula bonded thereto, may be prepared by using any method known in the art. For example, a carbon product containing a carboxylic acid group may be reacted with hydroxyalkyl bromide, and thereby a modified carbon product having a bonded Br group may be produced. Alternatively, a pigment having a bonded alcohol group may be reacted with an acylating agent containing a halogen atom. More methods for linking a radically transferable atom or group to a carbon product are described in U.S. Pat. No. 6,664,312.

The modified pigment may be prepared by using any method known by those having ordinary skill in the art, so as to link an organic chemical group to a pigment. Preferably, the modified pigment is prepared by using the methods described in U.S. Pat. Nos. 5,554,739, 5,707,432, 5,837,045, 5,851,280, 5,885,335, 5,895,522, 5,900,029, 5,922,118 and 6,042,643, and International Publication No. WO 99/23174. Other methods for preparing a modified pigment include allowing a pigment having a useful functional group to react with a reagent containing a radically transferable atom or group. Such a functional pigment may be prepared by using the methods described in the Reference Documents described above. Furthermore, a functional group containing carbon black may be prepared according to the methods described in U.S. Pat. Nos. 6,831,194 and 6,660,075, US Patent Application Publication Nos. 2003-0101901 and 2001-0036994, Canadian Patent No. 2351162, European Patent Nos. 1394221 and 1586607, and PCT International Publication No. WO 04/63289.

The radical polymerization process used to produce a polymer-modified pigment involves the use of at least one radical polymerizable monomer. A suitable radical polymerizable monomer that is used in the polymerization step contains at least one diene group or at least one vinyl group. Examples of the monomer include, but not limited to, acrylic acid, methacrylic acid, an acrylic acid ester, a (meth)acrylic acid ester, acrylonitrile, cyanoacrylic acid ester, maleic acid and fumaric acid diesters, vinyl pyridine, vinyl N-alkylpyrrole, vinyl acetate, vinyl oxazole, vinyl thiazole, vinyl pyrimidine, vinyl imidazole, allyl and vinyl ethers, vinyl ketone, and styrene. The vinyl ketone includes a compound in which the α-carbon atom of the alkyl group does not carry a hydrogen atom, such as a vinyl ketone in which both of the α-carbon atoms do not have a $C_1$-$C_4$ alkyl group, a halogen atom or the like; and a vinyl phenyl ketone in which the phenyl group is substituted with one to five $C_1$-$C_6$ alkyl groups and/or halogen atoms. The styrene includes a compound in which the vinyl group is substituted with a $C_1$-$C_6$ alkyl group at the α-carbon atom or the like; and/or a compound in which the vinyl group is substituted with one to five substituents including functional groups such as a $C_1$-$C_6$ alkyl, alkenyl (including vinyl), or an alkenyl (including acetylenyl) group, an alkynyl group, a phenyl group, a haloalkyl group and a $C_1$-$C_6$ alkoxy group, halogen, nitro, carboxyl, sulfonic acid, $C_1$-$C_6$ alkoxycarbonyl, hydroxyl (including one protected with a $C_1$-$C_6$ acyl group) and cyano group. Specific examples include methyl acrylate (MA), methyl methacrylate (MMA), butyl acrylate (BA), 2-ethylhexyl acrylate (EHA), acrylonitrile (AN), methacrylonitrile, styrene, and derivatives thereof.

In the preferred method for preparing a polymer-modified pigment, the concentration of the modified pigment is kept low during the polymerization step for producing a polymer-modified pigment having improved characteristics such as pigment dispersion stability. Preferably, the modified pigment is present in a solids content of about 1% to about 30%, more preferably about 2% to about 20%, and even more preferably about 5% to about 10%. For example, the modified pigment may be dispersed in water, NMP, methanol, anisole, or at least one other organic solvent, which contains a polymerizable monomer. There are no particular limitations on the concentration of the polymerizable monomer, and the concentration may be about 1% by mass to about 99% by mass. The amount of the polymerizable monomer may be varied depending on the amount of the modified pigment used.

The radical polymerization process may further include adding at least one transition metal catalyst which assists in accelerating the transfer of a radically transferable atom or group during the polymerization. A suitable transition metal catalyst includes a catalyst containing a transition metal and a ligand that coordinates the transition metal. Examples of the transition metal include copper, iron, rhodium, nickel, cobalt, palladium and ruthenium, which have suitable ligands. In some embodiments, the transition metal catalyst includes copper halide such as Cu(I)Br or Cu(I)Cl. Any ligand known in the art may be used, depending on the monomer used in the polymerization.

In the preferred method for preparing a polymer-modified pigment, the amount of the transition metal catalyst is regulated in order to produce a polymer-modified pigment having improved characteristics such as pigment dispersion stability. For example, the ratio of the amount of the transferable atom or group to the amount of the transition metal catalyst is preferably about 20:1 to about 500:1, more preferably about 50:1 to about 400:1, and even more preferably about 100:1 to about 300:1.

In a second embodiment, the polymer-modified pigment is preferably prepared by a process including a step of ionically polymerizing at least one polymerizable monomer from a modified pigment having at least one ionically transferable atom or group bonded thereto. Since the ionically polymerized monomer is polymerized "from" a modified pigment, this is a "grafting-from" process. Furthermore, the modified pigment provides a point of initiation for polymerization. Examples of such a method include the GTP process described above. The term "ionic" encompasses both cationic and anionic. In this embodiment, the pigment may be any of the pigments described above. The transferable atom or group and the polymerizable monomer may be any of those described above as being usable for ionic polymerization. For example, the transferable atom or group may include a silyl group such as a trimethylsilyl group, and the polymerizable monomer may be an acrylic acid ester, a methacrylic acid ester, or an alkyl vinyl ketone. Other monomers include, for example, those described in U.S. Pat. No. 4,508,880. The modified pigment may be prepared by using any of the processes described above.

In a third embodiment, the polymer-modified pigment is preferably prepared by a process including a step of polymerizing at least one polymerizable monomer from a modified pigment containing a pigment having at least one transferable atom or group bonded thereto. In this embodiment of the "grafting-from" process, the polymerizable monomer contains an ionizable group. Examples of the polymerizable monomer include acrylic acid, methacrylic acid, vinyl pyridine, dimethylaminoethyl acrylate, dimethylaminoethyl methacrylate, and derivatives thereof, and any of the polymerizable monomers described above which also contain an ionizable group, may be used. There, the ionizable group may be converted to an ionic group. Accordingly, the polymer-modified pigment prepared by this process contains a pigment having at least one ionic polymeric group bonded thereto.

In this embodiment, it is preferable to use a transition metal catalyst, the interaction of which with the reaction medium and the reaction components does not impede the activation of the catalyst during a desired polymerization process. It is also preferable that the transition metal catalyst be at least partially soluble in the reaction medium, and that the transition metal catalyst be sufficiently dissolved in the reaction medium so that at least a portion of the transition metal complex of both oxidation states is soluble in the reaction medium. Furthermore, the transition metal catalyst may have a low oxidation reduction potential (such as less than about 500 mV relative to NHE); may be stable to ion species and have an acidity stability constant of the protonated ligand of greater than about $10^{-4}$; may have a low propensity to disproportionation, with a conditional disproportionation constant of less than about 1000; or may have sufficient conditional metal radically transferable atom or group, so that the transition metal catalyst may work as a catalyst in an affinity reaction medium (such as greater than about 10). Preferably, the transition metal catalyst has all of these characteristics. Suitable examples of the catalyst are described in N. Tsarevsky, B. McKenzie, W. Tang and K. Matyjaszewksi, Polymer Preprints, 2005, 46(2), 482-483. For example, the transition metal catalyst may contain a heterodonor ligand which is useful in catalytic reactions in aqueous, polar, acidic, ionic and basic media or with polar, acidic, ionic and basic monomers. The heterodonor ligand may be a bidentate ligand or a multidentate ligand. In an acidic medium which may be a protonating compound or in another medium, the heterodonor ligand may contain a donor atom that cannot be protonated. The heterodonor ligand may have at least two donor atoms each independently selected from the group consisting of oxygen, sulfur, selenium, tellurium, nitrogen, phosphorus, arsenic, antimony and bismuth. A specific example of a useful heterodonor ligand is sodium salt of ethylenedithiolacetoacetic acid. Useful transition metal catalysts are described in more detail in US Patent Application Publication No. 2004-0122189.

For all of the polymerization processes described above that may be employed to prepare a polymer-modified pigment, the amount of the bonded polymeric group may vary depending on various factors including the particle size of the modified pigment, and the type and molecular weight of the polymer used. In general, the amount of the polymer is preferably 10 parts to 1000 parts, more preferably 20 parts to 800 parts, even more preferably 30 parts to 600 parts, particularly preferably 40 parts to 400 parts, and most preferably 50 parts to 200 parts, per 100 parts of the pigment.

Furthermore, for any of the above-described polymerization processes, there are available several preferred methods including the use of a polymerizable monomer of particular type. The details of such methods will be described below.

In a first preferred method, at least one of the polymerizable monomer contains a hydrophilic group that is not an ionic group. Examples of the hydrophilic nonionic group include, but not limited to, an ether, an alcohol and an amide group. Specific examples of the polymerizable monomer containing a hydrophilic nonionic group include 2-hydroxyethyl methacrylate (HEMA), 2-hydroxyethyl acrylate (HEA), N-vinyl pyrrolidone (NVP), N-vinylacetamide (NVAc), esters of acrylic acid and methacrylic acid containing an alkylene oxide group (such as polyethylene glycol acrylate or polyethylene glycol methacrylate), and derivatives thereof. Therefore, the polymeric group contains at least one hydrophilic nonionic functional group. The hydrophilic nonionic group may be pendant to the skeleton of the polymeric group. The pendant group may also be a polymeric group containing a hydrophilic nonionic group.

Alternatively, the polymeric group containing a hydrophilic nonionic group may also be prepared from at least one polymerizable monomer containing a reactive group that may be converted to a hydrophilic nonionic group. Therefore, the method includes a step of polymerizing at least one polymerizable monomer containing at least one reactive group, and may further include a step of converting at least a portion of these reactive groups to hydrophilic nonionic groups. For example, the polymerizable monomer may contain an acetoxy group such as vinyl acetate, or an ether group such as vinyl methyl ether, and all of these may be converted to alcohol groups.

In a second preferred method, at least one of the polymerizable monomer contains a reactive functional group that may be converted to a second group such as an ionic group. Therefore, the method includes a step of polymerizing at least one polymerizable monomer containing at least one reactive group, and further includes a step of converting at least a portion of these reactive groups to second groups. Examples of the reactive group include, but not limited to, an epoxy group (which may be converted to various second groups including a diol), an isocyanate group (which may be converted to a second group such as amine, carbamate, urea or biuret), a halomethylstyrene group including a chloromethylstyrene group (which may be converted to a second group such as ammoniummethylstyrene or hydroxymethylstyrene), an active ester group including nitrobenzyl ester (which may be converted to a carboxylic acid), and an ester of sulfonic acid (which may be converted to sulfonic acid). Preferred examples include reactive groups which may be converted to ionic groups. The polymer-modified pigment produced by this preferred method therefore contains an ionic group.

In an exemplary embodiment of this method, the reactive group is an ionizable group including a cationizable group or an anionizable group. The ionizable group means a group capable of producing an ionic group. An anionizable group produces an anion, while a cationizable group produces a cation. The conversion of a cationizable or anionizable group to a corresponding cationic or anionic group may be carried out by using any method that is known in the art. For example, a cationizable reactive group may be converted to a cationic group according to any of quaternization (such as allowing the cationizable group to react with an alkylating agent or another electrophile) or protonation (such as subjecting the cationizable group to a pH close to or lower than the pKb of the cationizable group). Therefore, for example, the polymerizable monomer may contain an amino group, and the method includes further conversion of the amino group into any of a protonated amino group or a quaternary ammonium group. Specific examples of the polymerizable monomer containing a cationizable group include, but not limited to, dimethylaminoethyl methacrylate (DMAEMA) and other dialkylaminoethyl methacrylates, dimethylaminoethyl acrylate (DMAEA) and other dialkylaminoethyl acrylates, 2-vinylpyridine (2VP), 4-vinylpyridine (4VP), and derivatives thereof. Furthermore, the ionizable group may be an anionizable group (such as a carboxylic acid group or a sulfonic acid group), and may be converted to an ionic group (such as a carboxylate group or sulfonate group) by deprotonation. Examples of the polymerizable monomer containing an anionizable group include, but not limited to, acrylic acid (AA), methacrylic acid (MAA), maleic acid, fumaric acid, itaconic acid, vinylsulfonic acid, acrylamidomethylpropanesulfonic acid (AMPS) and styrenesulfonic acid.

In another embodiment of this method, the reactive group is an ester group that may be converted to an anionic group. Therefore, for example, the reactive group may be an ester group that may be converted to a corresponding carboxylic acid group by hydrolysis and is capable of producing a carboxylate group under the conditions of hydrolysis. Examples of the polymerizable monomer containing a hydrolyzable ester group include, but not limited to, esters of acrylic acid and methacrylic acid, such as acrylic acid and methacrylic acid esters of $C_1$-$C_{20}$ alcohols, maleic anhydride, and derivatives thereof. The reactive group may be an ester group that may be converted to a corresponding acid group by dealkylation, and is capable of producing a carboxylate group under the conditions of hydrolysis. In this case, a preferred reactive ester group is a t-butyl ester group that may be converted to a carboxylate under particular reaction conditions. Examples of the polymerizable monomer containing a reactive t-butyl group include, but not limited to, t-butyl methacrylate (tBMA), t-butyl acrylate (tBA) and derivatives thereof.

In a third preferred method, the modified pigment may have at least one non-transferable atom or group bonded thereto. Therefore, the modified pigment may have both a transferable atom or group and a non-transferable atom or group. The methods described above for preparing the modified pigment containing at least one transferable atom or group, may also be used herein. The non-transferable group does not have a transferable atom such as a non-halogen atom containing the X group or alkyl group described above, but may have a structure such as shown above as a bonded transferable group. An additional example is a group containing an ionic or ionizable group such as a carboxylic acid group containing a —$C_6H_4$—COO— group, a sulfonic acid group containing a —$C_6H_4$—$SO_3$— group, or a salt thereof.

All of the processes described above for preparing the polymer-modified pigment may respectively further include a purification step which uses various known technologies. For example, the polymer-modified pigment may be purified by filtration, centrifugation, washing and the like, in order to remove unreacted raw materials, side-product salts and other reaction impurities. The polymer-modified pigment may also be separated by, for example, evaporating the components other than the polymer-modified pigment, or may be recovered after filtered and dried. Furthermore, the modified pigment may be dispersed in a suitable medium and then purified so as to remove any undesired soluble free species. Known technologies of ultrafiltration/membrane separation using a membrane or ion exchange may be used to purify the dispersion and to remove a significant amount of free ions and undesirable species.

The average particle size of the polymer-modified pigment is preferably greater than 10 nm and 1000 nm or smaller, more preferably greater than 20 nm and 500 nm or smaller, even more preferably greater than 30 nm and 450 nm or smaller, particularly preferably greater than 40 nm and 400 nm or smaller, and most preferably greater than 50 nm and e 350 nm or smaller, in the ink composition.

In the polymer-modified pigment contained in the ink composition, the amount of the ionic group contained in 1 g of the polymer-modified pigment is preferably about 0.05 millimoles or greater, more preferably about 0.1 millimoles or greater, and even more preferably about 0.3 millimoles or greater.

Furthermore, the amount of the polymer group bonded to the polymer-modified pigment is preferably about 12 millimoles or less, more preferably about 10 millimoles or less, and even more preferably about 4 millimoles or less, per gram of the polymer-modified pigment.

For example, the polymer-modified pigment may have a bonded polymer having an anionic group such as a carboxylate group. In this case, the amount of the anionic group is frequently expressed as the acid value of the polymer. Therefore, in the case where the bonded polymer contains an acid group, the polymer has an acid value of preferably about 20 or higher, more preferably about 40 or higher, even more preferably about 100 or higher, and most preferably about 130 or higher. The acid value is also preferably about 800 or lower, and more preferably about 400 or lower. This value may be determined, for example, according to any method known in the art, including titration.

In a particular exemplary embodiment, the anionic polymer-bonded type pigment is a carbon black pigment having a styrene-acrylic polymer covalently bonded to the surface. The styrene-acrylic polymer in this case preferably has an acid value of about 165 and a molecular weight of about 8,000. The styrene-acrylic polymer is preferably present on the carbon black in an amount of about 20% to about 30% of the mass of the anionic polymer-bonded type pigment. This anionic polymer-bonded type carbon black pigment is commercially available from Cabot Corporation (Boston, Mass., USA).

The anionic polymer-bonded type pigment is present in the ink composition in an amount of effective for providing a desired image quality (for example, optical density). For example, the anionic polymer-bonded type pigment may be present in an amount of 0.1% to 30% by mass relative to the total amount of the ink. A preferred content of the anionic polymer-bonded type pigment is 0.5% to 20% by mass, and more preferably 1% to 10% by mass, relative to the total amount of the ink, from the viewpoint of the aggregation speed obtainable when the anionic polymer-bonded type pigment is in contact with the fixing agent liquid.

[Second Anionic Polymer]

The second anionic polymer is insoluble in the water-based medium constituting the ink.

Here, the term "insoluble" means that when a polymer is mixed with a water-based medium at 25° C., the amount of the polymer dissolved in the water-based medium is 10% by mass or less as a mass ratio with respect to the total amount of the polymer mixed.

The second anionic polymer of the invention is such that a smaller mass ratio is more preferred, and the mass ratio is preferably 5% by mass or less, and particularly preferably 0% by mass, from the viewpoint of enhancing the continuous ejectability and ejection stability of the ink.

The second anionic polymer has a function of fixing the ink composition by undergoing aggregation when brought into contact with the fixing agent liquid described above or a region in which this fixing agent liquid has been dried, and thereby thickening the ink. Thus, the second anionic polymer is able to further enhance the fixability of the ink composition to the recording medium and the scratch resistance of the images.

Examples of the second anionic polymer include particles of resins having anionic groups, such as thermoplastic, thermosetting or modified acrylic, epoxy-based, polyurethane-based, polyether-based, polyamide-based, unsaturated polyester-based, phenolic, silicone-based or fluorine-based resins; polyvinylic resins such as vinyl chloride, vinyl acetate, polyvinyl alcohol, and polyvinyl butyral; polyester-based resins such as an alkyd resin and a phthalic acid resin; amino-based materials such as a melamine resin, a melamine formaldehyde resin, an aminoalkyd co-condensation resin, a urea resin, and a urea resin; copolymers and mixtures of these resins. Among these, the anionic acrylic resin may be obtained by polymerizing, for example, an acrylic monomer having an anionic group (anionic group-containing acrylic monomer) and optionally another monomer that is copolymerizable with the anionic group-containing acrylic monomer, in a solvent. The anionic group-containing acrylic monomer may be, for example, an acrylic monomer having one or more selected from the group consisting of a carboxyl group, a sulfonic acid group and a phosphonic acid group, and among them, an acrylic monomer having a carboxyl group (for example, acrylic acid, methacrylic acid, crotonic acid, ethacrylic acid, propylacrylic acid, isopropylacrylic acid, itaconic acid, or fumaric acid) is preferred, while acrylic acid or methacrylic acid is particularly preferred.

The second anionic polymer may be used singly, or two or more kinds may be used in combination.

The second anionic polymer is preferably in the form of particles of a self-dispersing polymer, from the viewpoint of the ejection stability and the liquid stability (particularly, dispersion stability) of the system containing the pigment.

The particles of a self-dispersing polymer mean the particles of a water-insoluble polymer which may be brought to a dispersed state in an aqueous medium by means of the functional group (particularly, an acidic group or a salt thereof) carried by the polymer itself in the absence of other surfactants, and which does not contain a free emulsifier. The aqueous medium is constituted to include water, and may contain a hydrophilic organic solvent as necessary. According to the invention, the aqueous medium is preferably composed of water and a hydrophilic organic solvent at a proportion of 0.2% by mass or less based on water, and is more preferably composed of water.

Here, the term dispersed state includes both of an emulsified state in which a water-insoluble polymer is dispersed in a liquid state in an aqueous medium (emulsion), and a dispersed state in which a water-insoluble polymer is dispersed in a solid state in an aqueous medium (suspension).

The water-insoluble polymer is preferably a water-insoluble polymer that may be brought to a dispersed state in which the water-insoluble polymer is dispersed in a solid state, from the viewpoint of the aggregation speed and fixability of the resulting ink composition.

The dispersed state of the particles of self-dispersing polymer means a state in which, even after a solution prepared by dissolving 30 g of a water-insoluble polymer in 70 g of an organic solvent (for example, methyl ethyl ketone), a neutralizing agent capable of neutralizing 100% of the salt-forming group of the water-insoluble polymer (if the salt-forming group is anionic, the neutralizing agent is sodium hydroxide; and if cationic, acetic acid), and 200 g of water are mixed and stirred (apparatus: stirring blade-equipped stirring apparatus, speed of rotation 200 rpm, for 30 minutes, 25° C.), and then the organic solvent is removed from the mixed liquid, it can be visually confirmed that the dispersed state is maintained stable for at least one week at 25° C.

Furthermore, the water-insoluble polymer refers to a polymer which gives an amount of dissolution of 10 g or less when the polymer is dried at 105° C. for 2 hours and then is dissolved in 100 g of water at 25° C., while the amount of dissolution is preferably 5 g or less, and more preferably 1 g or less. The amount of dissolution is an amount of dissolution obtainable when the water-insoluble polymer is neutralized 100% with sodium hydroxide or acetic acid in accordance with the type of the salt-forming group of the water-insoluble polymer.

There are no particular limitations on the main chain skeleton of the water-insoluble polymer, and for example, a vinyl polymer or a condensed polymer (an epoxy resin, a polyester, a polyurethane, a polyamide, a cellulose, a polyether, a polyurea, a polyimide, a polycarbonate or the like) may be used. Among them, a vinyl polymer is particularly preferred.

Suitable examples of the vinyl polymer and the monomer that constitutes the vinyl polymer include those described in JP-A Nos. 2001-181549 and 2002-88294. Furthermore, use may also be made of a vinyl polymer to which a dissociable group has been introduced at the terminals of the polymer chain by radical polymerization of a vinyl monomer using a chain transfer agent, a polymerization initiator or an iniferter, all of which have a dissociable group (or a substituent that may be derived into a dissociable group), or by ionic polymerization using a compound having a dissociable group (or a substituent that may be derived into a dissociable group) for an initiator or a terminator.

Furthermore, suitable examples of the condensed polymer and the monomer that constitutes the condensed polymer include those described in JP-A No. 2001-247787.

The particles of self-dispersing polymer preferably contain particles of a water-insoluble polymer which includes a hydrophilic constituent unit and a constituent unit derived from an aromatic group-containing monomer, from the viewpoint of self-dispersibility.

There are no particular limitations on the hydrophilic constituent unit as long as the constituent unit is derived from a hydrophilic group-containing monomer, and the constituent unit may be derived from one kind of hydrophilic group-containing monomer, or may be derived from two or more kinds of hydrophilic group-containing monomers. There are no particular limitations on the hydrophilic group, and the hydrophilic group may be a dissociable group or may be a nonionic hydrophilic group.

The hydrophilic group according to the invention is preferably a dissociable group, and more preferably an anionic dissociable group, from the viewpoint of the promotion of self-dispersion and from the viewpoint of the stability of the resulting emulsified or dispersed state. Examples of the dissociable group include a carboxyl group, a phosphoric acid group, and a sulfonic acid group, and among them, a carboxyl group is preferred from the viewpoint of fixability obtainable when an ink composition is formulated.

The hydrophilic group-containing monomer according to the invention is preferably a dissociable group-containing monomer from the viewpoint of self-dispersibility and aggregatability, and a dissociable group-containing monomer having a dissociable group and an ethylenically unsaturated bond is preferred.

Examples of the dissociable group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamido-2-methylpropanesulfonic acid, 3-sulfopropyl (meth)acrylate, and bis-(3-sulfopropyl)-itaconic acid ester.

Specific examples of the unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociable group-containing monomers, an unsaturated carboxylic acid monomer is preferred, an acrylic monomer is more preferred, and acrylic acid and methacrylic acid are particularly preferred, from the viewpoint of dispersion stability and ejection stability.

The particles of self-dispersing polymer according to the invention preferably contains particles of a polymer having a carboxyl group, and more preferably contains particles of a polymer having a carboxyl group and an acid value (mg KOH/g) of 25 to 100, from the viewpoint of the self-dispersibility, and the aggregation speed when particles of the self-dispersing polymer are brought into contact with the fixing agent liquid. Furthermore, the acid value is more preferably 30 to 90, and particularly preferably 35 to 65, from the viewpoint of the self-dispersibility, and the aggregation speed when particles of the self-dispersing polymer are brought into contact with the fixing agent liquid.

Particularly, when the acid value is 25 or higher, self-dispersibility and stability are improved, and when the acid value is 100 or lower, aggregatability is enhanced.

There are no particular limitations on the aromatic group-containing monomer as long as the monomer is a compound containing an aromatic group and a polymerizable group. The aromatic group may be a group derived from an aromatic hydrocarbon, or may be a group derived from an aromatic heterocyclic ring. According to the invention, the aromatic group is preferably an aromatic group derived from an aromatic hydrocarbon, from the viewpoint of the particle shape stability in an aqueous medium.

The polymerizable group may be a polymerizable group capable of polycondensation reaction, or may be a polymerizable group capable of addition polymerization. According to the invention, from the viewpoint of the particle shape stability in an aqueous medium, a polymerizable group capable of addition polymerization is preferred, and a group containing an ethylenically unsaturated bond is more preferred.

The aromatic group-containing monomer according to the invention is preferably a monomer having an aromatic group derived from an aromatic hydrocarbon and an ethylenically unsaturated bond. The aromatic group-containing monomer may be used singly, or two or more kinds of aromatic group-containing monomers may be used in combination.

Examples of the aromatic group-containing monomer include phenoxyethyl (meth)acrylate, benzyl (meth)acrylate, phenyl (meth)acrylate, and styrene-based monomers. Among them, from the viewpoint of the balance between hydrophilicity and hydrophobicity of the polymer chain, and from the viewpoint of ink fixability, an aromatic group-containing (meth)acrylate monomer is preferred, and at least one selected from phenoxyethyl (meth)acrylate, benzyl (meth)acrylate, and phenyl (meth)acrylate is more preferred, while phenoxyethyl (meth)acrylate and benzyl (meth)acrylate are even more preferred.

Here, the expression "(meth)acrylate" means acrylate or methacrylate.

The self-dispersing polymer according to the invention is preferably an acrylic resin including a constituent unit derived from a (meth)acrylate monomer, and is preferably an acrylic resin including a constituent unit derived from an aromatic group-containing (meth)acrylate monomer. More preferably, the self-dispersing polymer includes a constituent unit derived from an aromatic group-containing (meth)acrylate monomer, and the content of this constituent unit is 10% by mass to 95% by mass. When the content of the aromatic group-containing (meth)acrylate monomer is 10% by mass to 95% by mass, the stability in a self-emulsified or dispersed state is enhanced, and an increase in the ink viscosity may be suppressed.

According to the invention, from the viewpoint of the stability of the self-dispersed state, stabilization of the particle shape in an aqueous medium under the hydrophobic interaction between aromatic rings, and a decrease in the amount of water-soluble components due to appropriate hydrophobization of the particles, the content of the aromatic group-containing (meth)acrylate monomer is more preferably 15% by mass to 90% by mass, even more preferably 15% by mass to 80% by mass, and particularly preferably 25% by mass to 70% by mass.

The self-dispersing polymer according to the invention may be constructed using, for example, a constituent unit derived from an aromatic group-containing monomer and a constituent unit derived from a dissociable group-containing monomer. Furthermore, the self-dispersing polymer may further include another constituent unit as necessary.

There are no particular limitations on the monomer that forms the other constituent unit, as long as the monomer is copolymerizable with the aromatic group-containing monomer and the dissociable group-containing monomer. Among others, an alkyl group-containing monomer is preferred from the viewpoint of the flexibility of the polymer skeleton or the ease of control of the glass transition temperature (Tg).

Examples of the alkyl group-containing monomer include (meth)acrylic ester-based monomers, such as an alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer having a hydroxyl group, such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; and a dialkylaminoalkyl (meth)acrylate such as dimethylaminoethyl (meth)acrylate; and (meth)acrylamide-based monomers, such as an N-hydroxyalkyl (meth)acrylamide such as N-hydroxymethyl (meth)acrylamide, N-hydroxyethyl (meth)acrylamide, or N-hydroxybutyl (meth)acrylamide; and an N-alkoxyalkyl (meth)acrylamide such as N-methoxymethyl (meth)acrylamide, N-ethoxymethyl (meth)acrylamide, N-(n-, iso-)butoxymethyl (meth)acrylamide, N-methoxyethyl (meth)acrylamide, N-ethoxyethyl (meth)acrylamide, or N-(n-, iso-)butoxyethyl (meth)acrylamide.

The molecular weight of the water-insoluble polymer that constitutes the particles of self-dispersing polymer is, in terms of weight average molecular weight, preferably 3000 to 200,000, more preferably 5000 to 150,000, and even more preferably 10,000 to 100,000. When the weight average molecular weight is 3000 or greater, the amount of water-soluble components may be effectively suppressed, and when the weight average molecular weight is 200,000 or less, the self-dispersion stability may be enhanced.

The weight average molecular weight is measured by gel permeation chromatography (GPC). GPC is carried out using HLC-8020GPC (trade name, manufactured by Tosoh Corporation), using TSKGEL SUPER MULTIPORE HZ-H (trade name, manufactured by Tosoh Corporation, 4.6 mm ID×15 cm) columns, with three columns connected in series, and using tetrahydrofuran (THF) as an eluent. GPC is carried out under the conditions of a sample concentration of 0.35% by mass, a flow rate of 0.35 ml/min, a sample injection amount of 10 μl, and a measurement temperature of 40° C., using an RI detector. The calibration curve is produced using eight samples of "standard sample TSK standard polystyrene" manufactured by Tosoh Corporation, including "F-40", "F-20", "F-4", "F-1", "A-5000", "A-2500", "A-1000" and "n-propylbenzene".

From the viewpoint of controlling the hydrophilicity and hydrophobicity of the polymer, the water-insoluble polymer that constitutes the particles of self-dispersing polymer preferably includes a structural unit derived from an aromatic group-containing (meth)acrylate monomer (preferably, a structural unit derived from phenoxyethyl (meth)acrylate and/or a structural unit derived from benzyl (meth)acrylate), at a copolymerization proportion of 15% to 80% by mass relative to the total mass of the self-dispersing polymer particles.

Furthermore, from the viewpoint of controlling the hydrophilicity and hydrophobicity of the polymer, the water-insoluble polymer preferably includes a constituent unit derived from an aromatic group-containing (meth)acrylate monomer at a copolymerization proportion of 15% to 80% by mass, a constituent unit derived from a carboxyl group-containing monomer, and a constituent unit derived from an alkyl group-containing monomer (preferably, a structural unit derived from an alkyl ester of (meth)acrylic acid); and more preferably includes a structural unit derived from phenoxyethyl (meth)acrylate and/or a structural unit derived from benzyl (meth)acrylate at a copolymerization proportion of 15% to 80% by mass, a constituent unit derived from a carboxyl group-containing monomer, and a constituent unit derived from an alkyl group-containing monomer (preferably, a structural unit derived from a $C_{1-4}$ alkyl ester of (meth)acrylic acid). In addition, the water-insoluble polymer preferably has an acid value of 25 to 100 mg KOH/g and a weight average molecular weight of 3000 to 200,000; and more preferably has an acid value of 30 to 90 mg KOH/g and a weight average molecular weight of 5000 to 150,000.

Specific examples of the water-insoluble polymer that constitutes the particles of self-dispersing polymer (exemplary compounds B-01 to B-19) will be listed below. However, the invention is not intended to be limited to these. The numbers in the parentheses represent the mass ratio of the copolymerized components.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/methacrylic acid copolymer (50/44/6)

B-04: Phenoxyethyl acrylate/methyl methacrylate/ethyl acrylate/acrylic acid copolymer (30/55/10/5)

B-05: Benzyl methacrylate/isobutyl methacrylate/methacrylic acid copolymer (35/59/6)

B-06: Styrene/phenoxyethyl acrylate/methyl methacrylate/acrylic acid copolymer (10/50/35/5)

B-07: Benzyl acrylate/methyl methacrylate/acrylic acid copolymer (55/40/5)

B-08: Phenoxyethyl methacrylate/benzyl acrylate/methacrylic acid copolymer (45/47/8)

B-09: Styrene/phenoxyethyl acrylate/butyl methacrylate/acrylic acid copolymer (5/48/40/7)

B-10: Benzyl methacrylate/isobutyl methacrylate/cyclohexyl methacrylate/methacrylic acid copolymer (35/30/30/5)

B-11: Phenoxyethyl acrylate/methyl methacrylate/butyl acrylate/methacrylic acid copolymer (12/50/30/8)

B-12: Benzyl acrylate/isobutyl methacrylate/acrylic acid copolymer (93/2/5)

B-13: Styrene/phenoxyethyl methacrylate/butyl acrylate/acrylic acid copolymer (50/5/20/25)

B-14: Styrene/butyl acrylate/acrylic acid copolymer (62/35/3)

B-15: Methyl methacrylate/phenoxyethyl acrylate/acrylic acid copolymer (45/51/4)

B-16: Methyl methacrylate/phenoxyethyl acrylate/acrylic acid copolymer (45/49/6)

B-17: Methyl methacrylate/phenoxyethyl acrylate/acrylic acid copolymer (45/48/7)

B-18: Methyl methacrylate/phenoxyethyl acrylate/acrylic acid copolymer (45/47/8)

B-19: Methyl methacrylate/phenoxyethyl acrylate/acrylic acid copolymer (45/45/10)

There are no particular limitations on the method for producing a water-insoluble polymer that constitutes the particles of self-dispersing polymer according to the invention, and examples of the method include a method of performing emulsion polymerization in the presence of a polymerizable surfactant and thereby covalently bonding the surfactant with the water-insoluble polymer; and a method of copolymerizing a monomer mixture including the hydrophilic group-containing monomer and aromatic group-containing monomer described above, by a known polymerization method such as a solution polymerization method or a bulk polymerization method. Among the polymerization methods, from the viewpoint of the aggregation speed and the droplet ejection stability obtainable when an ink composition is formulated, a solution polymerization method is preferred, and a solution polymerization method using an organic solvent is more preferred.

From the viewpoint of the aggregation speed, it is preferable that the self-dispersing polymer according to the invention contain a polymer synthesized in an organic solvent, and that the polymer have a carboxyl group, having all or a part of the carboxyl groups of the polymer (preferably having an acid value of 25 to 100, more preferably an acid value of 30 to 90, and even more preferably an acid value of 35 to 65) neutralized, and be prepared as a polymer dispersion containing water as a continuous phase. That is, the production of the self-dispersing polymer particles according to the invention is preferably carried out by providing a step of synthesizing a polymer in an organic solvent, and a dispersing step of preparing an aqueous dispersion in which at least a part of the carboxyl groups of the polymer have been neutralized.

The dispersing step preferably includes the following step (1) and step (2).

Step (1): a step of stirring a mixture containing a polymer (water-insoluble polymer), an organic solvent, a neutralizing agent, and an aqueous medium.

Step (2): a step of removing the organic solvent from the mixture.

The step (1) is preferably a treatment of first dissolving a polymer (water-insoluble polymer) in an organic solvent, subsequently slowly adding a neutralizing agent and an aqueous medium thereto, and mixing and stirring the mixture to obtain a dispersion. As such, when a neutralizing agent and an aqueous medium are added to a water-insoluble polymer solution dissolved in an organic solvent, self-dispersing polymer particles which do not require a strong shearing force and have a particle size that gives higher storage stability, may be obtained.

There are no particular limitations on the method of stirring the mixture, and a mixing and stirring apparatus that is commonly used, or if necessary, a dispersing machine such as an ultrasonic dispersing machine or a high pressure homogenizer, may be used.

Preferred examples of the organic solvent include an alcohol-based solvent, a ketone-based solvent, and an ether-based solvent.

Examples of the alcohol-based solvent include isopropyl alcohol, n-butanol, t-butanol, and ethanol. Examples of the ketone-based solvent include acetone, methyl ethyl ketone, diethyl ketone, and methyl isobutyl ketone. Examples of the ether-based solvent include dibutyl ether and dioxane. Among these solvents, a ketone-based solvent such as methyl ethyl ketone, and an alcohol-based solvent such as isopropyl alcohol are preferred. Furthermore, it is also preferable to use isopropyl alcohol and methyl ethyl ketone in combination, for the purpose of moderating the changes in polarity at the time of phase transition from an oil phase to an aqueous phase. When those solvents are used in combination, self-dispersing polymer particles which lack aggregation and precipitation or fusion between particles, and have a fine particle size with high dispersion stability, may be obtained.

The neutralizing agent is used so as to have a part or all of the dissociable groups neutralized, and to thereby allow the self-dispersing polymer to form a stable emulsified or dispersed state in water. In the case where the self-dispersing polymer has an anionic dissociable group (for example, a carboxyl group) as a dissociable group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxides include lithium hydroxide, sodium hydroxide, and potassium hydroxide. Among them, from the viewpoint of the dispersion stabilization of the self-dispersing polymer particles in water, sodium hydroxide, potassium hydroxide, triethylamine and triethanolamine are preferred.

It is preferable to use these basic compounds in an amount of 5% to 120% by mole, more preferably 10% to 110% by mole, and even more preferably 15% to 100% by mole, relative to 100% by mole of the dissociable group. When the content of the basic compound is set at 15% by mole or greater, an effect of stabilizing the dispersion of particles in water is manifested, and when the content of the basic compound is set at 100% by mole or less, an effect of reducing water-soluble components is manifested.

In the step (2), an aqueous dispersion of self-dispersing polymer particles may be obtained by distilling off the organic solvent from the dispersion obtained in the step (1) by a conventional method such as distillation under reduced pressure, and thereby converting the phase to an aqueous phase. The organic solvent in the aqueous dispersion thus obtained has been substantially removed, and the amount of the organic solvent in the aqueous dispersion is preferably 0.2% by mass or less, and more preferably 0.1% by mass or less.

The average particle size of the particles of self-dispersing polymer is, in terms of volume average particle size, preferably in the range of 10 to 400 nm, more preferably in the range of 10 to 200 nm, and even more preferably in the range of 10 to 100 nm. When the volume average particle size is 10 nm or greater, production suitability is enhanced, and when the volume average particle size is 400 nm or less, storage stability is enhanced.

Furthermore, there are no particular limitations on the particle size distribution of the self-dispersing polymer particles, and any of polymer particles having a broad particle size distribution and polymer particles having a monodisperse particle size distribution may be used. Two or more kinds of water-insoluble particles may be used in mixture.

The average particle size and particle size distribution of the self-dispersing polymer particles are properties determined by measuring the volume average particle size by a dynamic light scattering method using a Nanotrac particle size distribution analyzer (trade name: UPA-EX150, manufactured by Nikkiso Co., Ltd.).

The glass transition temperature (Tg) of the self-dispersing polymer particles is preferably 30° C. or higher, more preferably 40° C. or higher, and even more preferably 50° C. or higher, from the viewpoint of the storage stability of the aqueous ink.

The particles of self-dispersing polymer are such that one kind of particles may be used singly, or two or more kinds of particles may be used in mixture.

Suitable examples of the second anionic polymer include particles of acrylic polymers which contain only an acrylic monomer and a (meth)acrylate-based monomer as copolymerized components, among acrylic resins, but these are only an example.

Examples of the acrylic polymers include the acrylic resins containing only an acrylic monomer and a (meth)acrylate-based monomer as copolymerized components, which have been previously described in connection with the particles of self-dispersing polymer, and preferred embodiments are also as described above. Specific examples include the aforementioned polymers B-01 to B-05, B-07, B-08, B-10 to B-12 and B-15 to B-19, but the examples are not limited to these.

Another suitable example of the second anionic polymer is particles of a styrene-acrylic polymer, but this is only an example.

Examples of the styrene-acrylic polymer include the acrylic resins containing styrene as a copolymerized component, which have been previously described in connection with the particles of self-dispersing polymer, and preferred embodiments are also as described above. Specific examples thereof include the polymers B-06, B-09, B-13 and B-14, but the examples are not limited to these.

Furthermore, regarding the styrene-acrylic polymer, various commercially available products may also be used as long as the products are insoluble in the water-based medium that constitutes the ink. Examples of the commercially available products include, but not limited to, the JONCRYL (registered trademark) series manufactured by BASF Group.

The second anionic polymer is preferably a polyurethane from the viewpoint of further enhancing the continuous ejectability and ejection stability obtainable when an ink composition is formulated. A polyurethane hardly undergoes deterioration as a result of photodegradation as compared with acrylic polymers, and therefore, the images formed with an ink composition containing a polyurethane has enhanced light resistance.

A suitable example of the polyurethane that is used in the invention is particles of a polyurethane containing at least one kind of polyurethanes represented by the following formulas UP-1 to UP-4.

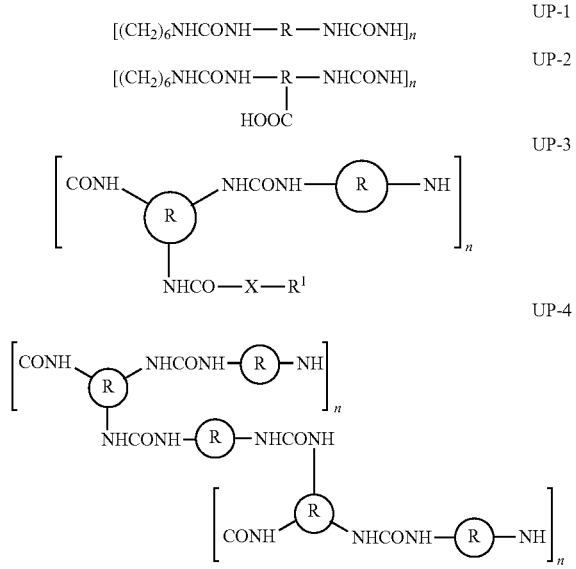

In the formulas UP-1 to UP-4, R represents an aliphatic group or an aromatic group; $R^1$ represents $—(CH_2)_m—COOH$ or $—(CH_2CH_2O)_p—CH_3$; m represents an integer from 1 to 10; p represents an integer from 1 to 100; X represents NH or O; and n represents any integer.

The polyurethanes represented by the above formulas UP-1 to UP-4 are preferably in a form having crosslinking bonding in the polymer. Thereby, the shear stability of the particles of polyurethane is enhanced.

Furthermore, the polyurethanes represented by the above formulas UP-1 to UP-4 are preferably in a form containing an acidic group from the view point of enhancing the stability of the particles of polyurethane.

There are no particular limitations on the polyurethanes represented by the above formulas UP-1 to UP-4 and the method for producing preferred embodiments of the polyurethanes, but for example, the production method described in JP-A No. 2006-241457 is suitable. That is, it is a production method of producing a polyurethane by preparing an emulsion containing an isocyanate compound and an anionic surfactant, adding a bifunctional, trifunctional or polyfunctional reactive agent thereto, and stirring the mixture.

The average particle size of the polyurethane particles used in the invention is, in terms of volume average particle size, preferably 50 nm to 500 nm, more preferably 100 nm to 300 nm, and even more preferably 150 nm to 250 nm.

The glass transition temperature (Tg) of the polyurethane particles used in the invention is preferably 30° C. or higher, more preferably 40° C. or higher, and even more preferably 50° C. or higher, from the viewpoint of the storage stability of the aqueous ink. The Tg of the polyurethane may be adjusted by the alkyl chain length in the polymer, and when the alkyl chain length is increased, Tg rises.

The content of the second anionic polymer in the ink composition is preferably 0.5% to 30% by mass, more preferably 1% to 15% by mass, and even more preferably 2% to 10% by mass, relative to the total mass of the ink composition, from the viewpoint of the aggregation speed, and the scratch resistance and glossiness of images. When particles of an acrylic polymer, particles of a styrene-acrylic polymer or particles of polyurethane are used as the second anionic polymer, the content of these particles is also as described above.

The content ratio (mass ratio) of the pigment and the second anionic polymer in the ink composition (self-dispersing pigment/second anionic polymer) is preferably 1/0.5 to 1/10, and more preferably 1/1 to 1/4, from the viewpoint of the scratch resistance of images or the like. When particles of an acrylic polymer, particles of a styrene-acrylic polymer or particles of polyurethane are used as the second anionic polymer, the content ratio of pigment and polymer in the ink composition is also as described above.

[Surfactant]

The ink according to the invention preferably contains at least one surfactant. The surfactant is used as a surface tension adjusting agent. Examples of the surface tension adjusting agent include a nonionic surfactant, a cationic surfactant, an anionic surfactant, and a betaine surfactant.

The surfactant is preferably incorporated in an amount capable of adjusting the surface tension of the ink composition to 20 to 60 mN/m, in order to achieve satisfactory droplet ejection by an inkjet method. Inter alia, the content of the surfactant is preferably an amount capable of adjusting the surface tension to 20 to 45 mN/m, and more preferably an amount capable of adjusting the surface tension to 25 to 40 mN/m.

The surface tension of the ink composition is measured by a plate method using an automatic surface tensiometer (trade name: CBVP-Z, manufactured by Kyowa Interface Science Co., Ltd.) under the conditions of 25° C.

Specific examples of the surfactant include, as hydrocarbons, anionic surfactants such as a fatty acid salt, an alkylsulfuric acid ester salt, an alkyl benzene sulfonate, an alkyl naphthalene sulfonate, a dialkyl sulfosuccinate, an alkyl phosphoric acid ester salt, a naphthalene sulfonic acid-formalin condensate, and a polyoxyethylene alkylsulfuric acid ester salt; and nonionic surfactants such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylene alkylamine, a glycerin fatty acid ester, and an oxyethylene-oxypropylene block copolymer. Furthermore, OLFINE (trade name, manufactured by Nissin Chemical Co., Ltd.) and SURFYNOLS (trade name, manufactured by Air Products and Chemicals, Inc.), which are acetylene-based polyoxyethylene oxide surfactants, are also used with preference. An amine oxide type amphoteric surfactant such as N,N-dimethyl-N-alkylamine oxide is also preferred.

In addition, the surfactants described in pages (37) to (38) of JP-A No. 59-157636 and Research Disclosure No. 308119 (1989) may also be used.

The fluorine-based (fluoroalkyl-based) surfactants, silicone-based surfactants and the like described in JP-A Nos. 2003-322926, 2004-325707 and 2004-309806 may also be used, and scratch resistance may be ameliorated.

These surface tension adjusting agents may also be used as defoamants, and a fluorine-based compound, a silicone-based compound, and a chelating agent represented by EDTA may also be used.

According to the invention, from the viewpoint that the unevenness of image density may be improved, it is preferable to incorporate a nonionic surfactant into the ink. Examples of the nonionic surfactant include a nonionic ether surfactant, a polyoxyethylene oleic acid, a nonionic ester surfactant, and a nonionic fluorine-based surfactant.

Examples of the nonionic ether surfactant include, but not limited to, polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, and polyoxyalkylene alkyl ether.

Examples of the nonionic ester surfactant include, but not limited to, a polyoxyethylene oleic acid ester, a polyoxyethylene distearic acid ester, a sorbitan lauric acid salt, a sorbitan monostearic acid salt, a sorbitan monooleic acid salt, a sorbitan sesquioleic acid salt, a polyoxyethylene monooleic acid salt, and a polyoxyethylene stearic acid salt.

Examples of the nonionic fluorine-based surfactant include, but not limited to, a fluoroalkyl ester, and a perfluoroalkylcarboxylic acid salt.

The nonionic surfactants are available as commercially marketed products, and for example, the various commercially available products described in paragraph [0020] of JP-A No. 2006-159907 may also be used.

The mass ratio of the nonionic surfactant in the ink is preferably 1% by mass or less, more preferably 0.5% by mass or less, and even more preferably 0.3% by mass or less, from the viewpoint of effective improving the density unevenness of images.

[Other Additives]

The ink according to the invention may further contain other additives in addition to the components described above. Examples of the other additives include known additives such as a discoloration preventing agent, an emulsion stabilizer, a penetration accelerating agent, an ultraviolet absorber, a preservative, an antifungal agent, a pH adjusting agent, a defoamant, a viscosity adjusting agent, a dispersant, a dispersion stabilizer, a corrosion inhibitor, and a chelating agent. These various additives may be added directly after the preparation of the aqueous ink composition, and may also be added during the preparation of the aqueous ink composition.

As the pH adjusting agent, a neutralizing agent (an organic base or an inorganic alkali) may be used. The pH adjusting agent is preferably added such that the pH of the aqueous ink composition is 6 to 10, and more preferably added such that the pH is 7 to 10, from the viewpoint of enhancing the storage stability of the aqueous ink composition. The pH is measured under the conditions of 25° C.

The viscosity of the ink composition according to the invention is preferably in the range of 1 to 30 mPa·s, more preferably in the range of 1 to 20 mPa·s, even more preferably in the range of 2 to 15 mPa·s, and particularly preferably in the range of 2 to 10 mPa·s, from the viewpoint of the ejection stability in the case of ejecting the ink composition by an inkjet method, and the aggregation speed obtainable when a fixing agent liquid is used.

The viscosity of the aqueous ink composition is measured using a viscometer (trade name: TV-22, manufactured by Toki Sangyo Co., Ltd.) under the conditions of 20° C.

From the viewpoint of the dispersion stability of the ink, low corrosiveness to the members constituting the inkjet recording apparatus, the ejection stability in the case of ejecting by an inkjet method, and the aggregation speed obtainable when a fixing agent liquid is used, the pH of the ink composition according to the invention is preferably in the range of 6 to 10, and from the viewpoint of the dispersion stability of the ink over a long time, the pH is more preferably in the range of 7 to 10, even more preferably in the range of 7.5 to 10, and particularly preferably in the range of 7.5 to 9.5. The pH is a value measured under the conditions of 25° C.

<<Image Forming Method>>

The image forming method of the invention makes use of the inkjet ink set of the invention, and has a fixing agent liquid applying step of applying the fixing agent liquid described above on a recording medium, and an ink applying step of recording an image by applying the ink on the recording medium by an inkjet method.

When such a constitution is employed, the scratch resistance of images is enhanced, and the formation of high quality images is made possible.

The image forming method of the invention may have another step as necessary. An example of the other step may be a heating fixing step of heating an ink image formed by applying an ink, and thereby fixing the ink image to the recording medium.

<Fixing Agent Liquid Applying Step>

In the fixing agent liquid applying step according to the invention, the fixing agent liquid is applied on a recording medium. The details of the constitution and preferred embodiments of the fixing agent liquid used in the present step are as described above.

Application of the fixing agent liquid may be carried out by a known method such as a coating method, an inkjet method or an immersion method. The coating method may be carried out according to a known coating method using a bar coater, an extrusion die coater, an air doctor coater, a blade coater, a rod coater, a knife coater, a squeeze coater, a reverse roll coater or the like. The details of the inkjet method will be described with regard to the ink applying step that will be described later.

The fixing agent liquid applying step may be provided any time before or after the ink applying step that will be described below. According to the invention, an embodiment of providing the ink applying step after the fixing agent liquid applying step is preferred. That is, preferred is an embodiment in which before an ink is applied on a recording medium, a fixing agent liquid for aggregating the color material (preferably, a pigment) in the ink is applied in advance, an ink is applied so as to be brought into contact with the fixing agent liquid applied on the recording medium, and thus an image is formed. Thereby, the speed of image formation may be increased, and despite the increase in speed, images with high density and resolution may be obtained.

There are no particular limitations on the amount of application of the fixing agent liquid as long as the ink may be aggregated with the amount, but preferably, the amount of application of the fixing agent liquid may be adjusted so as to result in an amount of application of the acidic precipitant as an aggregating component of 0.1 $g/m^2$ or greater. Inter alia, an amount which results in an amount of application of the acidic precipitant of 0.1 to 1.0 $g/m^2$ is preferred, and an amount which results in an amount of application of the acidic precipitant of 0.2 to 0.8 $g/m^2$ is more preferred. When the amount of application of the acidic precipitant is 0.1 $g/m^2$ or greater, the aggregation reaction proceeds satisfactorily, and when the amount of application is 1.0 $g/m^2$ or less, the degree of glossiness is not excessively increased, which is preferable.

Furthermore, according to the invention, it is preferable to further provide a heating drying step of heating and drying the fixing agent liquid on the recording medium, between a time point after the ink applying step is provided after the fixing agent liquid applying step so as to apply the fixing agent liquid on the recording medium, and a time point before the ink is applied thereon. When the fixing agent liquid is heated and dried in advance before the ink applying step, ink coloring properties such as the prevention of bleeding may be improved, and visible images having satisfactory color density and satisfactory color tone may be recorded.

The heating and drying process may be carried out by means of a known heating unit such as a heater, an air blowing unit utilizing air blowing, such as a dryer, or a unit combining these. Examples of the heating method include a method of supplying heat with a heater or the like from the side of the recording medium where the fixing agent liquid has been applied and from the opposite side; a method of blowing warm air or hot air to the surface of the recording medium where the fixing agent liquid has been applied; and a method of heating using an infrared heater, and plural kinds of these heating methods may be used in combination.

<Ink Applying Step>

In the ink applying step according to the invention, an image is recorded by applying the ink on the recording medium by an inkjet method. The details of the constitution and preferred embodiments of the ink used in the present step are as described above.

There are no particular limitations on the inkjet method, and any known system may be employed, for example, a charge control system that ejects ink by utilizing an electrostatic attraction force; a piezo inkjet system that ejects ink by utilizing a piezoelectric element generating mechanical strains when a voltage is applied; an acoustic inkjet system that converts electric signals into acoustic beams, irradiates ink with the beams, and ejects the ink by utilizing a radiation pressure; and a thermal inkjet (BUBBLEJET (registered trademark)) system that heatsink to form bubbles and utilizes the pressure resulting therefrom.

Furthermore, the inkjet method also includes the usage of a system that injects a large number of small-volume droplets of a low-concentration ink called photo-ink; a system that improves the image quality by using plural kinds of inks having a substantially identical color but different concentrations; and a system that makes use of a colorless transparent ink.

In the inkjet method according to the invention, the piezo inkjet system is suitable. By combining the inkjet ink set of the invention and the piezo inkjet system, the continuous ejectability and ejection stability of the ink are further enhanced.

In the piezo inkjet system, the form of strain of the piezoelectric element may be any of a bent mode, a longitudinal mode and a shear mode. The constitution of the piezoelectric element and the structure of the piezo head may be achieved by employing known technologies, without any particular limitations.

There are no particular limitations on the ink nozzle and the like that are used when recording is performed by an inkjet method, and the ink nozzle and the like may be appropriately selected according to the purpose.

The inkjet method may employ a shuttle system in which a short serial head is used, and recording is performed while the head is allowed to move in a scanning manner along the width direction of the recording medium; as well as a line system that makes use of a line head in which recording elements are arranged to face the entire length of one side of the recording medium. In the line system, image recording may be performed over the entire surface of the recording medium by scanning the recording medium in the direction perpendicular to the direction in which the recording elements are arranged. Furthermore, since only the recording medium is made to move, an improvement of the recording speed may be realized, as compared with the shuttle system.

The amount of liquid droplets of the ink that is ejected from the inkjet head is preferably 0.2 to 10 picoliters (pL), and more preferably 0.4 to 5 pL.

The maximum total amount of ejection of ink during the image recording is preferably in the range of 10 to 36 ml/m$^2$, and more preferably in the range of 15 to 30 ml/m$^2$.

Furthermore, according to the invention, it is preferable to further provide a step of heating and drying the ink on the recording medium, after the ink applying step. When the ink is heated and dried after the ink applying step, the aggregation speed of the ink may be increased. Heating and drying may be carried out by the same means as that used in the step of heating and drying the fixing agent liquid as described above.

<Heating Fixing Step>

A heating fixing step allows heating of the image recorded by applying the ink, and thereby fixing the image on the recording medium. When an image is subjected to a heating and fixing treatment, fixing of the image on the recording medium is achieved, and the scratch resistance of the image may be further enhanced. Therefore, it is preferable to provide a heating fixing step in the image forming method of the invention.

It is preferable to perform heating at a temperature equal to or higher than the minimum film-forming temperature (MFT) of the second anionic polymer in the image. When the image is heated to the MFT or higher, the polymer particles form a film, and thus the image is strengthened.

The pressure that is applied together with heating is preferably in the range of 0.1 to 3.0 MPa, more preferably in the range of 0.1 to 1.0 MPa, and even more preferably in the range of 0.1 to 0.5 MPa, from the viewpoint of surface smoothening.

There are no particular limitations on the method of heating, but suitable examples include methods of drying in a non-contact manner, such as a method of heating with a heating body such as a nichrome wire heater; a method of supplying warm air or hot air; and a method of heating with a halogen lamp, an infrared lamp or the like. Furthermore, there are no particular limitations on the method of heating and applying pressure, but suitable examples include methods of carrying out heating and fixing by contact, such as a method of pressing a hot plate against the image-formed surface of the recording medium; and a method of passing an image between a pair of heating and pressing rollers, between a pair of heating and pressing belts, or between a pair of rollers using a heating and pressing apparatus that is equipped with a heating and pressing belt disposed on the image-recorded surface side of the recording medium, and a retaining roller disposed on the other side of the heating and pressing belt.

In the case of heating and applying pressure, the nip time is preferably 1 millisecond to 10 seconds, more preferably 2 milliseconds to 1 second, and even more preferably 4 milliseconds to 100 milliseconds. Furthermore, the nip width is preferably 0.1 mm to 100 mm, more preferably 0.5 mm to 50 mm, and even more preferably 1 mm to 10 mm.

The heating and pressing roller may be a metallic roller made of a metal, or may be a roller having a core made of a metal, and a coating layer formed of an elastomer and, if necessary, a surface layer (also called as "releasable layer"), surrounding the metal core. The metal core of the latter may be composed of, for example, a cylinder made of iron, aluminum or SUS, while the surface of the metal core is preferably at least partially covered with the coating layer. Particularly, the coating layer is preferably formed of a silicone resin or a fluororesin, which has mold releasability. It is also preferable that the metal core in one of the heating and pressing rollers have a heating body mounted inside, and the recording medium may be heated by passing the recording medium between rollers, by simultaneously subjecting the recording medium to a heat treatment and a pressing treatment, or if necessary, by placing the recording medium between two heating rollers. Preferable examples of the heating body include a halogen lamp heater, a ceramic heater, and a nichrome wire.

The belt substrate that constitutes the heating and pressing belt used in the heating and pressing apparatus is preferably seamless nickel-plated brass, and the thickness of the substrate is preferably 10 to 100 μm. As the material of the belt substrate, aluminum, iron, polyethylene and the like may also be used in addition to nickel. When a silicone resin or a fluororesin is provided, the thickness of the layer formed by using these resins is preferably 1 to 50 μm, and more preferably 10 to 30 μm.

Furthermore, in order to achieve the aforementioned pressure (nip pressure), for example, an elastic member such as a spring having tension may be selected and installed at both ends of the roller such as a heating and pressing roller, with the nip interval taken into consideration, so as to obtain a desired nip pressure.

The conveying speed of the recording medium in the case of using a heating and pressing roller or a heating and pressing belt, is preferably in the range of 200 to 700 mm/seconds, more preferably 300 to 650 mm/seconds, and even more preferably 400 to 600 mm/seconds.

[Recording Medium]

The image forming method of the invention is intended to record an image on a recording medium. There are no particular limitations on the recording medium used, but the recording medium may be a so-called a coated paper which is used in general offset printing or the like, or may be a paper for exclusive use in inkjet printing.

The coated paper is a paper produced by applying a coating material on the surface of high quality paper or neutral paper, which is mainly composed of cellulose and is generally non-surface-treated, and thereby providing a coating layer thereon. In regard to the coated paper, any recording medium that is commercially available in general may be purchased and used. Specific examples include high quality paper (A) such as "OK PRINCE HIGH QUALITY" (trade name, manufactured by Oji Paper Co., Ltd.), "SHIRAOI" (trade name, manufactured by Nippon Paper Group, Inc.), and "NEW NPI HIGH QUALITY" (trade name, manufactured by Nippon Paper Group, Inc.); finely coated paper such as "OK EVER LIGHT COAT" (trade name, manufactured by Oji Paper Co., Ltd.) and "AURORA S" (trade name, manufactured by Nippon Paper Group, Inc.); lightweight coated paper (A3) such as "OK COAT L" (trade name, manufactured by Oji Paper Co., Ltd.) and "AURORA L" (trade name, manufactured by Nippon Paper Group, Inc.); coated paper (A2, B2) such as "OK TOPCOAT+" (trade name, manufactured by Oji Paper Co., Ltd.) and "AURORA COAT" (trade name, manufactured by Nippon Paper Group, Inc.); and art paper (A1) such as "OK KANEFUJI+" (trade name, manufactured by Oji Paper Co., Ltd.) and "TOKUBISHI ART" (trade name, manufactured by Mitsubishi Paper Mills Limited).

Hereinafter, exemplary embodiments of the invention will be listed below.

<1> An inkjet ink set, comprising a fixing agent liquid which comprises a cationic polymer and an acidic precipitant; and an ink which comprises a water-based medium, a pigment having a first anionic polymer covalently bonded thereto, and a second anionic polymer, wherein the second anionic polymer is insoluble in the water-based medium.

<2> The inkjet ink set as described in item <1>, wherein the water-based medium comprises a hydrophilic organic solvent.

<3> The inkjet ink set as described in item <1> or <2>, wherein the cationic polymer is at least one selected from the group consisting of a polymer of hexamethylene guanide, a polymer of hexamethylene biguanide, and a copolymer of hexamethylene guanide and hexamethylene biguanide.

<4> The inkjet ink set as described in any one of items <1> to <3>, wherein the acidic precipitant is at least one selected from the group consisting of methanesulfonic acid, citric acid, succinic acid, phosphoric acid, glycolic acid, acetic acid, tartaric acid, oxalic acid, and derivatives or salts thereof <5> The inkjet ink set as described in any one of items <1> to <4>, wherein the second anionic polymer is at least one selected from the group consisting of an acrylic polymer, a styrene-acrylic polymer, and a polyurethane.

<6> The inkjet ink set as described in any one of items <1> to <5>, wherein the content of the second anionic polymer in the ink is from 0.5% by mass to 30% by mass.

<7> The inkjet ink set as described in any one of items <1> to <6>, wherein the ink further comprises a nonionic surfactant.

<8> The inkjet ink set as described in any one of items <1> to <7>, wherein the pigment is carbon black.

<9> An image forming method, comprising:
applying a fixing agent liquid onto a recording medium,
applying an ink onto the recording medium by inkjet printing and thereby recording an image, wherein the inkjet ink set as described in any one of items <1> to <8> is used in the method.

<10> The image forming method as described in item <9>, wherein the inkjet method employs a piezo inkjet system.

<11> The image forming method as described in item <9> or <10>, further comprising heating the image recorded by the applying of the ink and thereby fixing the image onto the recording medium.

EXAMPLES

Hereinafter, the invention will be more specifically explained by way of Examples, but as long as the gist is maintained, the invention is not intended to be limited to the following Examples. In addition, unless not particularly stated otherwise, the "percentage (%)" and "parts" are on a mass basis.

The weight average molecular weight was measured by gel permeation chromatography (GPC). GPC was performed using HLC-8020GPC (trade name, manufactured by Tosoh Corporation), using three TSKGEL SUPER MULTIPORE HZ-H (trade name, manufactured by Tosoh Corporation, 4.6 mm ID×15 cm) columns, and using tetrahydrofuran (THF) as an eluent. GPC was carried out under the conditions of a sample concentration of 0.35% by mass, a flow rate of 0.35 ml/min, a sample injection amount of 10 μl, and a measurement temperature of 40° C., using an RI detector. The calibration curve was produced using eight samples of "standard sample TSK standard polystyrene" manufactured by Tosoh Corporation, including "F-40", "F-20", "F-4", "F-1", "A-5000", "A-2500", "A-1000" and "n-propylbenzene".

<Production of Pigment Having First Anionic Polymer Covalently Bonded Thereto>

(Production of Halogen Group-Modified Pigment)

550 g (in terms of solids content) of carbon black (trade name: BLACK PEARLS (trademark) 700, manufactured by Cabot Corporation) and 150.8 g of p-aminobenzoic acid were mixed with 1000 g of deionized water, and the mixture was heated to 50° C. and stirred for 15 minutes. To this mixture, a solution prepared by dissolving 68 g of $NaNO_2$ in 200 mL of water was added, and the mixture was heated to 60° C. and stirred for 3 hours. Subsequently, the mixture was diluted with water until the concentration of the carbon black reached about 15% (in terms of solids content), and thereby precipitates were removed. The dilution was purified by centrifugation and membrane separation, and thus a dispersion of carbon black was obtained.

Hydrochloric acid was added to 15 g of the dispersion obtained as described above to thereby acidify the dispersion up to pH 2, and thus carbon black was precipitated. This was filtered, washed with water, centrifuged, and then dried in a vacuum, and thus a dry powder of carbon black was obtained.

The dry powder obtained as described above was added to 250 mL of dry THF, and the mixture was homogenized by using a rotor stator mixer. To this mixture, 18 g of dicyclohexylcarbodiimide (DCC), 2.6 g of N,N-dimethylaminopyridine (DMAP) and 19.4 g of 2,2-dimethyl-3-hydroxypropyl α-bromoisobutyrate were added. The mixture was stirred and mixed for 5 hours, and while the mixture was stirred with a magnetic stirrer, the mixture was allowed to react overnight. Subsequently, the reaction mixture was centrifuged several times in THF, and thus a modified carbon black having a halogen group (halogen group-modified carbon black) was obtained.

(Production of Polymer-Modified Pigment)

1.20 g of the halogen group-modified carbon black obtained as described above, CuBr2 (0.5 mL stock solution in anisole, 0.0143 mmol), 100 mL (0.476 mmol) of pentamethyldodecanetriamine, 11.3 g (0.088 mol) of n-butyl acrylate (n-BA) and 8 mL of anisole were added to a Schlenk flask, and the mixture was deaerated using three freeze-pump-thaw cycles. Separately, a product obtained by stirring CuBr (97%, manufactured by Aldrich Chemical Co., Ltd.) in glacial acetic acid was filtered, and the solids were washed 3 times with ethanol and 2 times with diethyl ether and dried in a vacuum. The content obtained after the deaeration as described above was frozen, and 0.068 g of CuBr obtained as described above was added to the flask in a nitrogen atmosphere. Polymerization was carried out for 13 hours at 70° C., and thereby the reaction mixture was converted to 7% of n-butyl acrylate. Subsequently, the product was purified by centrifugation, and thus a poly(n-BA)-modified carbon black (polymer-modified pigment having poly(n-BA) covalently bonded) was obtained.

0.76 g of the poly(n-BA)-modified carbon black obtained as described above was dried in a vacuum for 12 hours, and then was dispersed in 4 mL of anisole by a low temperature ultrasonication treatment for 30 minutes. To the dispersion, 5.65 g (0.044 mmol) of t-butyl acrylate (t-BA) and CuBr2 (0.25 mL stock solution in anisole, 0.00714 mmol) were added, and the mixture was ultrasonicated at low temperature in a nitrogen atmosphere. 50 mL (0.238 mmol) of pentamethyldodecanetriamine was added to the dispersion, and then the dispersion was deaerated using a freeze-pump-thaw cycle. 0.034 g (0.238 mmol) of CuBr was added thereto in a nitrogen atmosphere, thereby polymerization was carried out at 70° C. for 60 hours, and then the product was purified by centrifugation. Subsequently, 0.5 g of the purification product was dealkylated by placing overnight the purification product in a solution of 1.2 g of trifluoroacetic acid dissolved in 20 mL of THF.

As such, a polymer-modified carbon black having a polyacrylic acid polymer covalently bonded thereto was obtained.

(Preparation of Pigment Dispersion A)

The polymer-modified carbon black obtained as described above was mixed with ion-exchanged water at the following composition, and the mixture was subjected to a dispersion treatment for 3.5 hours in a bead mill using 0.1-mm φ zirconia beads. Subsequently, the mixture was filtered, and water was added to obtain a carbon black concentration of 10.0% by mass. Thus, a dispersion of a polymer-modified carbon black (pigment dispersion A) was prepared.

"Composition of Pigment Dispersion A"

| Polymer-modified carbon black | 15.0 parts |
| Ion-exchanged water | 85.0 parts |

<Production of Pigment Coated with Polymer Dispersant>
(Synthesis of Resin Dispersant P-1)

In a 1000-ml three-necked flask equipped with a stirrer and a cooling tube, 90 g of methyl ethyl ketone was added and was heated to 70° C. in a nitrogen atmosphere, and to this, a solution prepared by dissolving 0.83 g of dimethyl-2,2'-azobisisobutyrate, 70 g of phenoxyethyl methacrylate, 10 g of methacrylic acid and 20 g of methyl methacrylate in 52 g of methyl ethyl ketone was added dropwise over 3 hours. After completion of the dropwise addition, the mixture was allowed to react for another one hour, and then a solution prepared by dissolving 0.44 g of dimethyl-2,2'-azobisisobutyrate in 2 g of methyl ethyl ketone was added thereto. The temperature of the mixture was raised to 80° C., and the mixture was heated for 5 hours. The reaction solution thus obtained was reprecipitated two times in excess hexane, and a resin precipitated therefrom was dried. Thus, 93.2 g of a phenoxyethyl methacrylate/methyl methacrylate/methacrylic acid (copolymerization ratio [mass ratio]=70/20/10) copolymer (resin dispersant P-1) was obtained.

The composition of the resin dispersant P-1 thus obtained was confirmed by $^1$H-NMR, and the weight average molecular weight (Mw) determined by GPC was 45,000. Furthermore, the acid value of this polymer was determined by the method described in JIS Standards (JIS K 0070: 1992), and the acid value was 66.2 mg KOH/g.

(Preparation of Pigment Dispersion B)

In a first dispersing step, various components of the following composition were mixed, and the mixture was dispersed for 2 hours in a bead mill using 0.1-mm φ zirconia beads. Subsequently, in a second dispersing step, a composition containing the resin dispersant P-1 as described below was added to the dispersion, and the mixture was dispersed for another 2 hours. Under reduced pressure, methyl ethyl ketone was removed from the resulting dispersion at 55° C., and a portion of water was further removed to thereby adjust the carbon black concentration to 10.0% by mass. Thus, a dispersion of a polymer-dispersed type pigment (pigment dispersion B) was prepared (removing step).

"Composition in First Dispersing Step"

| | |
|---|---|
| Carbon black | 10.0 parts |
| (#2600, manufactured by Mitsubishi Chemical | |
| Corporation, primary particle size 13 nm, pH 6.5) | |
| Resin dispersant P-1 | 3.7 parts |
| Methyl ethyl ketone | 20.0 parts |
| 1 Normal aqueous NaOH solution | 6.8 parts |
| Ion-exchanged water | 55.7 parts |

"Composition Ratio of Composition to be Added in Second Dispersing Step"

| Resin dispersant P-1 | 1.0 part |
| Methyl ethyl ketone | 2.6 parts |

<Production of Second Anionic Polymer>
(Preparation of Polymer Dispersant C)

In 2-liter three-necked flask equipped with a stirrer, a thermometer, a reflux cooling tube and a nitrogen gas inlet tube, 360.0 g of methyl ethyl ketone was fed, and the temperature was raised to 75° C. While the temperature inside the reaction vessel was maintained at 75° C., a mixed solution containing 180.0 g of phenoxyethyl acrylate, 162.0 g of methyl methacrylate, 18.0 g of acrylic acid, 72 g of methyl ethyl ketone, and 1.44 g of "V-601" (trade name, manufactured by Wako Pure Chemical Industries, Ltd.) was added dropwise to the flask at a constant rate so that the dropwise addition was completed in 2 hours. After completion of the dropwise addition, a solution containing 0.72 g of "V-601" and 36.0 g of methyl ethyl ketone was added to the flask, and the mixture was stirred for 2 hours at 75° C. Subsequently, a solution containing 0.72 g of "V-601" and 36.0 g of isopropanol was added to the flask, and the resulting mixture was stirred for 2 hours at 75° C. Subsequently, the temperature was raised to 85° C., and stirring was continued for another 2 hour. Thus, a resin solution of a phenoxyethyl acrylate/methyl methacrylate/acrylic acid (=50/45/5 [mass ratio]) copolymer was obtained.

The weight average molecular weight (Mw) of the copolymer thus obtained was 64,000 (calculated relative to polystyrene standards by GPC), and the acid value was 38.9 (mg KOH/g).

To 668.3 g of the resin solution obtained as described above, 388.3 g of isopropanol and 145.7 ml of a 1 mol/L aqueous NaOH solution were added, and the temperature inside the reaction vessel was raised to 80° C. Subsequently, 720.1 g of distilled water was added dropwise to the flask at a rate of 20 ml/min, and thereby the mixture was converted to an aqueous dispersion. Thereafter, the reaction vessel was maintained for 2 hours at a temperature of 80° C., for 2 hours at 85° C., and for 2 hours at 90° C. under atmospheric pressure. The pressure inside the reaction vessel was then reduced, and a total amount of 913.7 g of isopropanol, methyl ethyl ketone and distilled water was distilled off. Thus, an aqueous dispersion of an anionic polymer at a solids concentration of 28.0% (polymer dispersion C) was obtained.

(Preparation of Polymer Dispersion D)

100.5 g of methyl methacrylate, 117.5 g of hexyl acrylate, 24 g of ethyl monomethacryloyloxysuccinate, 2.3 g of ethylene glycol dimethacrylate, and 1.0 g of isooctyl thioglycolate were mixed, and thus a mixture of monomers was prepared. Subsequently, 85 g of water and 20.8 g of 30% RHODAFAC (trademark) were added to the foregoing monomer mixture, the resulting mixture was stirred carefully in a shearing manner, and thus an emulsion was prepared. At the same time, 0.87 g of potassium persulfate was dissolved in 100 g of water to prepare an initiator solution, and this initiator solution was added dropwise to 725 g of water that had been heated to 90° C. in a reactor. This dropwise addition was carried out while water was stirred. While addition of the initiator solution was continued, the emulsion was further added dropwise to water, so as to achieve the addition of the emulsion. The reaction mixture thus obtained was stirred for 2 hours at 90° C., and then was cooled. When the temperature of the reactor reached about 50° C., 23 g of a 17.5% solution of potassium hydroxide was added to the reactor, and thus the pH of the reaction mixture was adjusted to 8.5. The resulting reaction mixture was filtered through a 200-mesh filter, and thus an aqueous dispersion of an anionic polymer (polymer dispersant D) was obtained.

(Evaluation of Solubility of Anionic Polymer in Water-Based Medium)

Various components were mixed at the composition ratios indicated in Table 1, and thereby, mixed liquids A to C respectively containing a water-based medium composed of water and a water-soluble organic solvent and an anionic polymer were obtained.

JONCRYL (registered trademark) 586 (trade name, manufactured by BASF Group) indicated in Table 1 is a styrene-acrylic acid copolymer.

The mixed liquids A to C were subjected to an evaluation of solubility of the anionic polymer in a water-based medium, by the method described below. The state in which the mixed liquid was a transparent solution under the conditions of a liquid temperature of 25° C. and suspension and precipitation was not confirmed, was designated as "dissolution". When the mixed liquid was not a transparent solution and suspension was confirmed, ultrafiltration was carried out using an ultrafiltration membrane having a molecular weight cut-off of 10,000, and then the filtrate which was transparent by visual inspection was dried. The mass of the dried product was measured, and this mass was designated as the amount of dissolution of the anionic polymer. The results are presented in Table 1.

TABLE 1

|  | Mixed liquid A | Mixed liquid B | Mixed liquid C |
|---|---|---|---|
| Tripropylene glycol | 10.5 | 10.5 | 10.5 |
| Triethylene glycol monomethyl ether | 5.3 | 5.3 | 5.3 |
| 2-Hydroxyethyl-2-pyrrolidone | 5.3 | 5.3 | 5.3 |
| Polymer dispersion C | 8 * | — | — |
| Polymer dispersion D | — | 8 * | — |
| JONCRYL 586 | — | — | 8 * |
| Sodium hydroxide | Amount to adjust to pH 8.5 | Amount to adjust to pH 8.5 | Amount to adjust to pH 8.5 |
| Ion-exchanged water | Balance | Balance | Balance |
| Evaluation by visual inspection | Suspension | Suspension | Dissolution |
| Amount of dissolution of anionic polymer (Proportion relative to total solids content of mixture) | Detection limit or lower | 20.3% | — |

The composition ratio is in mass %, and the symbol * represents that the value is calculated in terms of solids content.

From the results of Table 1, it was found that JONCRYL 586 was dissolved in the water-based media constituting the mixed liquids A to C, and the polymer dispersion D was partially dissolved in the water-based medium. On the other hand, it was found that the polymer dispersion C was insoluble in the water-based medium.

The water-based media constituting the mixed liquids A to C and the water-based media constituting the inks A to E that will be described below, have the same composition of water and the water-soluble organic solvent. The pH of the respective liquids is also almost identical.

Therefore, it was found that JONCRYL 586, the polymer dispersion C and polymer dispersion D exhibited the same solubility as the results shown in Table 1, even for the water-based media constituting the inks A to E that will be described below.

<Preparation of Ink>

Ink compositions were prepared at the composition ratios indicated in Table 2, and then the ink composition were filtered with a 0.2-μm membrane filter. Thus, inks A to E were obtained.

CAB-O-JET300 (trade name, manufactured by Cabot Corporation) used in Table 2 is a self-dispersing type carbon black having a carboxyl group (—COOH) at the pigment surface. OLFINE E1010 (trade name, manufactured by Nissin Chemical Co., Ltd.) is an acetylene glycol-based surfactant, and PROXEL XL2 (trade name, manufactured by ICI plc.) is a preservative.

TABLE 2

|  | Ink A | Ink B | Ink C | Ink D | Ink E |
| --- | --- | --- | --- | --- | --- |
| Pigment dispersion A | 4 * | — | — | 4 * | 4 * |
| Pigment dispersion B | — | 4 * | — | — | — |
| CAB-O-JET300 | — | — | 4 * | — | — |
| Tripropylene glycol | 10 | 10 | 10 | 10 | 10 |
| Triethylene glycol monomethyl ether | 5 | 5 | 5 | 5 | 5 |
| 2-Hydroxyetyl-2-pyrrolidone | 5 | 5 | 55 | 5 | 5 |
| Phosphoric acid ester-based surfactant | 0.25 | 0.25 | 0.25 | 0.25 | 0.25 |
| Nonionic fluorine-based surfactant | 0.25 | 0.25 | 0.25 | 0.25 | 0.25 |
| OLFINE E1010 | 0.5 | 0.5 | 0.5 | 0.5 | 0.25 |
| Polymer dispersion C | 8 * | 8 * | 8 * | — | — |
| Polymer dispersion D | — | — | — | 8 * | — |
| JONCRYL 586 | — | — | — | — | 8 * |
| PROXEL XL2 | 0.3 | 0.3 | 0.3 | 0.3 | 0.3 |
| Ion-exchanged water | Balance | Balance | Balance | Balance | Balance |
| pH of ink | 8.4 | 8.5 | 8.4 | 8.5 | 8.5 |

The composition ratio is in mass %, and the symbol * represents that the value is calculated in terms of solids content.

<Preparation of Fixing Agent Liquid>

Various components were mixed at the composition ratios indicated in Table 3, and thereby, fixing agent liquids T-1 to T-7 were obtained.

ZONYL FSN100 (trade name, manufactured by DuPont Co.) used in Table 3 is a nonionic fluorine-based surfactant, and PAA-HCL-05 (trade name, manufactured by Nitto Boseki Co., Ltd.) is a cationic polymer (allylamine hydrochloride polymer).

factured by Mitsubishi Paper Mills Limited; coefficient of water absorption $Ka=0.21$ $mL/m^{2-}ms^{1/2}$) was provided as a recording medium.

TOKUBISHI ART DOUBLE-SIDED N was fixed on a stage that was capable of moving at 500 mm/second in a predetermined linear direction, which was a slow-scanning direction during recording. Each of the fixing agent liquids T-1 to T-7 was applied on this recording medium with a wire bar coater to a thickness of about 10 μm (corresponding to an amount of cationic polymer of 0.4 $g/m^2$). Immediately after the application, the fixing agent liquid was dried for 2 seconds at 50° C.

Thereafter, the GELJET GX5000 printer head was fixed and arranged such that the line head direction (fast scanning direction) along which nozzles were aligned was tilted by

TABLE 3

|  | T-1 | T-2 | T-3 | T-4 | T-5 | T-6 | T-7 |
| --- | --- | --- | --- | --- | --- | --- | --- |
| Propylene glycol n-propyl ether | 1 | 1 | 1 | 1 | 1 | 1 | 1 |
| Ethylene glycol | 5 | 5 | 5 | 5 | 5 | 5 | 5 |
| Diethylene glycol monobutyl ether | 0.4 | 0.4 | 0.4 | 0.4 | 0.4 | 0.4 | 0.4 |
| Zonyl FSN100 | 0.3 | 0.3 | 0.3 | 0.3 | 0.3 | 0.3 | 0.3 |
| 2-Pyrrolidone | 10 | 10 | 10 | 10 | 10 | 10 | 10 |
| Methanesulfonic acid | Amount to adjust to pH 3.5 | — | Amount to adjust to pH 3.5 | — | Amount to adjust to pH 3.5 | — | — |
| Phosphoric acid | — | — | — | — | — | Amount to adjust to pH 2.0 | — |
| Oxalic acid | — | — | — | — | — | — | Amount to adjust to pH 3.5 |
| Na2EDTA | — | 0.1 | — | 0.1 | — | — | — |
| Poly (hexamethylenebiguanidine) | 4 | 4 | — | — | — | 4 | — |
| PAA-HCL-05 | — | — | 4 | 4 | 10 | — | 10 |
| Deionized water | Balance | Balance | Balance | Balance | Balance | Balance | Balance |

The composition ratio is in mass %.

<Image Formation>

A full-line printer head (trade name: GELJET GX5000, manufactured by Ricoh Company Ltd.; ink ejection by a piezo system) was provided, and the storage tanks connected to this printer head were respectively refilled with inks A to E. TOKUBISHI ART DOUBLE-SIDED N (trade name, manu- 75.7° relative to the direction orthogonal with the moving direction of the stage (slow-scanning direction) on the same surface, and while the recording medium was moved at a constant speed in the slow-scanning direction, ink was ejected by a line system under the ejection conditions of an ink droplet amount of 2.8 pL, an ejection frequency of 24 kHz, a resolution of 1200 dpi×1200 dpi, and a stage speed of 50 mm/second. Thus, an image recorded.

Immediately after the recording, the image was dried for 3 seconds at 60° C., and was passed through a pair of fixing rollers heated to 60° C. Thereby, a fixing treatment was carried out at a nip pressure of 0.25 MPa and a nip width of 4 mm. The fixing rollers consisted of a heating roll having a cylindrical metal core made of SUS, which had a halogen lamp mounted inside and had the surface coated with a silicone resin, and a counter roll that was pressing against the heating roll.

<Evaluation>

Evaluation samples were produced by the image forming method described above, and the following evaluations were performed. The results are presented in Table 4.

(Foamability and Defoamability of Ink)

10 g each of the inks A to E was sealed in a cylindrical glass container having a diameter of 2 cm and a height of 10 cm at a room temperature of 23° C. to 24° C., and the glass container was mixed by shaking 50 times. The foamability was evaluated based on the height H (cm) from the interface between foam and liquid to the highest point of foam. Furthermore, the defoamability was evaluated based on the time (minutes) taken by the height H to decrease to 0.5H.

(Continuous Ejectability)

For an image having ten wedge charts having a size of 1 cm×10 cm, with gaps between them, image formation of 2000 sheets was carried out in a continuous manner in an environment of 23° C. and 20% RH. The image of the 10th sheet and the image of the 2000th sheet were compared by visual observation, and the images were evaluated according to the following criteria. In connection with this evaluation, the fixing treatment described above was not carried out.

—Evaluation Criteria—

3: In any of the images of the 10th sheet and the 2000 th sheet, the occurrence of print warp or streaks (print streaking due to failed ejection) is not observed.

2: The occurrence of print warp is recognized in the image of the 2000 th sheet.

1: The occurrence of print warp and streaks is recognized in the image of the 2000th sheet.

(Restorability after Standstill)

For an image having ten wedge charts having a size of 1 cm×10 cm, with gaps between them, image formation of 10 sheets was carried out in a continuous manner in an environment of 23° C. and 20% RH. Image formation was stopped for 30 minutes, and then image formation of 10 sheets was carried out again in a continuous manner. The 10 sheets of image formed after the stopping, were visually observed, and an evaluation was performed according to the following criteria. In connection with this evaluation, the fixing treatment described above was not carried out.

—Evaluation Criteria—

3: The streaks (print streaking due to failed ejection of nozzles) occurring in the 1st sheet tends to be restored in the 10th sheet, and the occurrence of streaks in the 10th sheet is 2% by number or less.

2: The streaks occurring in the 1st sheet tends to be restored in the 10th sheet, and the occurrence of streaks in the 10th sheet is observed at greater than 2% by number and less than 10% by number.

1: The streaks occurring in the 1st sheet are not restored even in the 10th sheet, and the occurrence of streaks in the 10th sheet is observed at 10% by number or greater.

(Scratch Resistance)

Evaluation samples having a solid image of 100% duty formed thereon were naturally dried for 6 hours, and then the printed area was rubbed at a pen pressure of 300 g using an aqueous fluorescent pen (trade name: ZEBRA PEN2 (registered trademark), manufactured by Zebra Co., Ltd.). The presence or absence of contamination was visually observed, and an evaluation was made according to the following criteria.

—Evaluation Criteria—

5: Even though the same area is rubbed five times, no contamination occurs.

4: When the same area is rubbed three times, contamination occurs.

3: When the same area is rubbed two times, contamination occurs.

2: Contamination occurs with one time of rubbing.

1: Contamination occurs with one time of rubbing, and the image is disordered.

(Interference in Droplet Ejection)

Solid images were formed by changing the stage speed used in the image formation described above, to 100 mm/sec, 250 mm/sec, 350 mm/sec, or 500 mm/sec, and by changing the ejection frequency to achieve the same amount of droplet ejection. The degree of bleeding or mixed colors, which occurred between ink liquid droplets as a result of interference between ink liquid droplets (interference in droplet ejection), was visually observed, and high-speed aggregatability was evaluated at the fastest stage speed that did not show interference in droplet ejection.

—Evaluation Criteria—

4: Interference in droplet ejection is not observed at 500 mm/sec.

3: Interference in droplet ejection is not observed at 350 mm/sec.

2: Interference in droplet ejection is not observed at 250 mm/sec.

1: Interference in droplet ejection is not observed at 100 mm/sec.

(Degree of Glossiness in Glossy Paper)

Solid images of 100% duty were formed in an environment at 23° C. and 20% RH, while the recording medium used in the image formation described above was changed to PM photographic paper (manufactured by Seiko Epson Corporation). The degree of mirror surface glossiness at the image formed surface at an incident angle of 60°, was measured using a gloss checker (trade name: IG-320, manufactured by Horiba, Ltd.). The average value of five measurements was evaluated according to the following criteria.

—Evaluation Criteria—

3: The average value was 80 or greater.

2: The average value was 75 or greater and less than 80.

1: The average value was less than 75.

TABLE 4

| Ink | Fixing agent liquid | Ink Foamability (cm) | Defoamability (min) | Continuous ejectability | Restorability after standstill | Scratch resistance | Interference in droplet ejection | Degree of glossiness in glossy paper | Remarks |
|---|---|---|---|---|---|---|---|---|---|
| A | T-1 | 5 | 3 | 3 | 3 | 5 | 4 | 3 | Invented Example |
| A | T-3 | 5 | 3 | 3 | 3 | 4 | 3 | 3 | Invented Example |

TABLE 4-continued

| Ink | Fixing agent liquid | Foamability (cm) | Defoamability (min) | Continuous ejectability | Restorability after standstill | Scratch resistance | Interference in droplet ejection | Degree of glossiness in glossy paper | Remarks |
|---|---|---|---|---|---|---|---|---|---|
| A | T-5 | 5 | 3 | 3 | 3 | 4 | 4 | 3 | Invented Example |
| A | T-6 | 5 | 3 | 3 | 3 | 5 | 4 | 3 | Invented Example |
| A | T-7 | 5 | 3 | 3 | 3 | 4 | 4 | 2 | Invented Example |
| A | T-2 | 5 | 3 | 3 | 3 | 1 | 1 | 1 | Comparative Example |
| A | T-4 | 5 | 3 | 3 | 3 | 1 | 1 | 1 | Comparative Example |
| B | T-1 | 8 | 12 | 2 | 2 | 2 | 2 | 2 | Comparative Example |
| C | T-1 | 5 | 9 | 1 | 1 | 1 | 1 | 1 | Comparative Example |
| D | T-1 | 8 | 12 | 2 | 1 | 1 | 2 | 2 | Comparative Example |
| E | T-1 | 8 | 15 | 1 | 1 | 1 | 1 | 1 | Comparative Example |

As it is obvious from Table 4, the ink A has reduced occurrence of foaming, and has satisfactory defoamability.

Furthermore, as it is obvious from Table 4, the inkjet ink set of the invention is excellent in the continuous ejectability and restorability after standstill, and has satisfactory scratch resistance of the images formed with the inkjet ink set. The inkjet ink set of the invention is such that the interference in droplet ejection in the formed images is well suppressed, and the degree of glossiness is excellent when images are formed on glossy paper.

The systems described in JP-A No. 2008-105422, Japanese Patent No. 4224491 and JP-A No. 2006-159907 were unsatisfactory in view of the continuous ejectability and ejection stability (restorability of nozzles after standstill). This was noticeable when a piezo system was employed for the inkjet method.

According to the invention, there is provided an inkjet ink set which has excellent continuous ejectability and ejection stability and exhibits enhanced scratch resistance when images are formed, and an image forming method which is capable of enhancing the scratch resistance of images and forming high quality images.

All publications, patent applications, and technical standards mentioned in this specification are herein incorporated by reference to the same extent as if each individual publication, patent application, or technical standard was specifically and individually indicated to be incorporated by reference.

What is claimed is:

1. An inkjet ink set, comprising:
   a fixing agent liquid which comprises a cationic polymer and an acidic precipitant; and
   an ink which comprises a water-based medium, a pigment having a first anionic polymer covalently bonded thereto, and a second anionic polymer, wherein the second anionic polymer is insoluble in the water-based medium.

2. The inkjet ink set of claim 1, wherein the water-based medium comprises a hydrophilic organic solvent.

3. The inkjet ink set of claim 1, wherein the cationic polymer is at least one selected from the group consisting of a polymer of hexamethylene guanide, a polymer of hexamethylene biguanide, and a copolymer of hexamethylene guanide and hexamethylene biguanide.

4. The inkjet ink set of claim 1, wherein the acidic precipitant is at least one selected from the group consisting of methanesulfonic acid, citric acid, succinic acid, phosphoric acid, glycolic acid, acetic acid, tartaric acid, oxalic acid, and derivatives or salts thereof.

5. The inkjet ink set of claim 1, wherein the second anionic polymer is at least one selected from the group consisting of an acrylic polymer, a styrene-acrylic polymer, and a polyurethane.

6. The inkjet ink set of claim 1, wherein the content of the second anionic polymer in the ink is from 0.5% by mass to 30% by mass.

7. The inkjet ink set of claim 1, wherein the ink further comprises a nonionic surfactant.

8. The inkjet ink set of claim 1, wherein the pigment is carbon black.

9. An image forming method, comprising:
   applying a fixing agent liquid onto a recording medium,
   applying an ink onto the recording medium by inkjet printing and thereby recording an image,
   wherein the fixing agent liquid and the ink are those contained in the inkjet ink set of claim 1.

10. The image forming method of claim 9, wherein the inkjet method employs a piezo inkjet system.

11. The image forming method of claim 9, further comprising heating the image recorded by the applying of the ink and thereby fixing the image onto the recording medium.

* * * * *